United States Patent
Cambou

(10) Patent No.: US 9,985,791 B2
(45) Date of Patent: May 29, 2018

(54) PHYSICALLY UNCLONABLE FUNCTION GENERATING SYSTEMS AND RELATED METHODS

(71) Applicant: Arizona Board of Regents acting for and on behalf of Northern Arizona University, Flagstaff, AZ (US)

(72) Inventor: Bertrand Cambou, Flagstaff, AZ (US)

(73) Assignee: Arizona Board of Regents acting for and on behalf of Northern Arizona University, Flagstaff, AZ (US)

(*) Notice: Subject to any disclaimer, the term of this patent is extended or adjusted under 35 U.S.C. 154(b) by 185 days.

(21) Appl. No.: 14/958,436

(22) Filed: Dec. 3, 2015

(65) Prior Publication Data
US 2017/0048072 A1 Feb. 16, 2017

Related U.S. Application Data

(60) Provisional application No. 62/204,912, filed on Aug. 13, 2015.

(51) Int. Cl.
*H04L 9/00* (2006.01)
*H04L 9/32* (2006.01)
(Continued)

(52) U.S. Cl.
CPC ........ *H04L 9/3278* (2013.01); *G06F 12/1408* (2013.01); *G09C 1/00* (2013.01); *G06F 2212/1052* (2013.01); *H04L 2209/12* (2013.01)

(58) Field of Classification Search
CPC .. H01L 45/04; H01L 45/1233; G06F 11/1008; G06F 12/0893; G06F 11/076; G06F 11/1064; G06F 11/3058
See application file for complete search history.

(56) References Cited

U.S. PATENT DOCUMENTS

| | | |
|---|---|---|
| 4,161,041 A | 7/1979 | Butler et al. |
| 5,434,917 A | 7/1995 | Naccache et al. |

(Continued)

OTHER PUBLICATIONS

Dai Yamamoto et al., "Uniqueness Enhancement of PUF Responses Based on the Locations of Random Outputting RS Latches," Proceedings of the Workshop on Cryptographic Hardware and Embedded Systems 2011 (CHES 2011), Lecture Notes in Computer Science (LNCS) vol. 6917, pp. 390-406, 2011.

(Continued)

*Primary Examiner* — Ghazal Shehni
(74) *Attorney, Agent, or Firm* — IPTechLaw

(57) ABSTRACT

A physically unclonable function generating system and related methods. Implementations may include comparing at least one physical parameter of a memory cell with a threshold value of the physical parameter and identifying a relationship of the at least one physical parameter of the memory cell to the threshold value. Implementations may also include associating one of a 0, 1, or X state to the memory cell based on the relationship of the at least one physical parameter to the threshold value and programming at least one state storage memory cell to store a programmed value corresponding with the associated 0, 1, or X state. Implementations may include including the programmed value of the at least one state storage memory cell in a PUF data stream.

17 Claims, 17 Drawing Sheets

(51) Int. Cl.
*G06F 12/14* (2006.01)
*G09C 1/00* (2006.01)

(56) References Cited

U.S. PATENT DOCUMENTS

| | | | |
|---|---|---|---|
| 7,979,482 B2 | 7/2011 | Gammel et al. | |
| 8,023,301 B1 | 9/2011 | Srinivasan et al. | |
| 8,300,450 B2 | 10/2012 | Christensen et al. | |
| 2010/0293612 A1* | 11/2010 | Potkonjak | G06F 21/34 726/20 |
| 2011/0215829 A1 | 9/2011 | Guajardo et al. | |
| 2012/0265928 A1 | 10/2012 | Mut et al. | |
| 2014/0042442 A1 | 2/2014 | Bruley et al. | |
| 2014/0126306 A1* | 5/2014 | Otterstedt | G11C 7/06 365/189.07 |
| 2014/0140513 A1 | 5/2014 | BrightSky et al. | |
| 2014/0218067 A1 | 8/2014 | Li et al. | |
| 2014/0281294 A1 | 9/2014 | Dai et al. | |
| 2014/0344544 A1 | 11/2014 | Nakamura et al. | |
| 2015/0058928 A1 | 2/2015 | Guo et al. | |
| 2015/0070979 A1 | 3/2015 | Zhu et al. | |
| 2015/0071432 A1 | 3/2015 | Zhu et al. | |
| 2015/0101037 A1 | 4/2015 | Yang et al. | |

OTHER PUBLICATIONS

Dai Yamamoto et al., "Variety Enhancement of PUF responses using the locations of random outputting RS latches," J Cryptogr Eng (2013) 3:197-211, first published online Oct. 23, 2012.

Pravin Prabhu et al., "Extracting Device Fingerprints from Flash Memory by Exploiting Physical Variations," Proceedings of the 4th International Conference on Trust and Trustworthy Computing (TRUST 2011), Jun. 22-24, 2011, Pittsburgh, PA, available online at https://cseweb.ucsd.edu/~swanson/papers/TRUST2011FPUFs.pdf, last accessed Sep. 8, 2016.

Gargi Ghosh et al., "Write and Erase Threshold Voltage Interdependence in Resistive Switching Memory Cells," IEEE Transactions on Electron Devices, vol. 2, issue 9, pp. 2850-2856, published Aug. 14, 2015 and/or Sep. 2015.

Daniel E. Holcomb et al., "Power-Up SRAM State as an Identifying Fingerprint and Source of True Random Numbers," IEEE Transactions on Computers, vol. 58, Issue No. 9, pp. 1198-1210, Sep. 2009.

\* cited by examiner

| Memory Type | Physically Unclonable Function Patterns |
|---|---|
| 6T-SRAM | Random Flip of the 6T cell, starts as a 0 or 1 after power up of RAM |
| DRAM | Constant discharge of the capacitors, then measure to get a 1 or a 0 |
| Resistive RAM | Program and then measure the value of the Rmin's to get a 1 or a 0 based on a defined value |
| Magnetic RAM | Program and then measure the variation of the Rmax's to get a 1 or a 0 based on a defined value |
| Flash RAM | Partially program the cells, then measure to get a 1 or a 0 |

FIG. 1

PHYSICALLY UNCLONABLE FUNCTION GENERATING SYSTEMS AND RELATED METHODS

CROSS REFERENCE TO RELATED APPLICATIONS

This document claims the benefit of the filing date of U.S. Provisional Patent Application No. 62/204,912, entitled "Physically Unclonable Function Generating Systems and Related Methods" to Bertrand Cambou which was filed on Aug. 13, 2015, the disclosure of which is hereby incorporated entirely herein by reference.

BACKGROUND

1. Technical Field

Aspects of this document relate generally to systems and methods designed to facilitate secure communications and interactions between devices.

2. Background

Secure communications between devices generally have been implemented using authentication protocols and methods. For example, some conventional systems involve encrypting the content of data or messages transmitted between a server and a client computing system. Other conventional systems have involved transmitting encoded messages, where the sending and receiving ends both have copies of the key to the code used.

SUMMARY

Implementations of method of identifying a memory cell state for use in a physically unclonable function (PUF) may include comparing at least one physical parameter of a memory cell with a threshold value of the physical parameter and identifying a relationship of the at least one physical parameter of the memory cell to the threshold value. The method may also include associating one of a 0, 1, or X state to the memory cell based on the relationship of the at least one physical parameter to the threshold value and programming at least one state storage memory cell to store a programmed value corresponding with the associated 0, 1, or X state. The method may include including the programmed value of the at least one state storage memory cell in a PUF data stream.

Implementations of a method of identifying a memory cell state for use in a PUF may include one, all, or any of the following:

The memory cell may be a first memory cell and the at least one state storage memory cell may be at least a first state storage cell. The method may further include comparing at least one physical parameter of a second memory cell with the threshold value of the physical parameter, identifying a relationship of the at least one physical parameter of the second memory cell to the threshold value, and associating one of the 0, 1, and X state to the second memory cell based on the relationship of the at least one physical parameter to the threshold value. The method may also include programming at least one second state storage memory cell to store a programmed value corresponding with the associated 0, 1, or X state and including the programmed value of the at least one second state storage memory cell in the PUF data stream.

The at least one state storage memory cell may be the memory cell itself.

Programming at least one state storage memory cell may further including programming a first state storage memory cell and a second state storage memory cell. If the associated state of the memory cell is a 0, the method may include programming a 0 in the first state storage memory cell and programming a 1 in the second state storage memory cell. If the associated state of the memory cell is a 1, the method may include programming a 1 in the first state storage memory cell and programming a 0 in the second state storage memory cell. If the associated state of the memory cell is an X, the method may include programming a 0 in the first state storage memory cell and a 0 in the second state storage memory cell or programming a 1 in the first state storage memory cell and a 1 in the second state storage memory cell.

The first state storage memory cell may be included in a first row of memory cells and the second state storage memory cell may be included in a second row of memory cells adjacent to the first row.

The first state storage memory cell may be included in a first column of memory cells and the second state storage memory cell may be included in a second column of memory cells adjacent to the first column.

The PUF data stream may be a PUF ternary data stream including 0, 1, and X programmed values.

The PUF data stream may be a PUF binary data stream including 0 and 1 programmed values.

The method may further include extracting from the PUF data stream the X programmed values to form the PUF binary data stream.

The memory cell may be selected from the group consisting of a static random-access memory (SRAM), a dynamic random-access memory (DRAM), a resistive random-access memory (ReRAM), a magnetic random-access memory (MRAM), a flash memory, an electrically erasable programmable read-only memory (EEPROM), and any combination thereof.

Implementations of a method of identifying a memory cell state for use in a PUF may include comparing at least one physical parameter of a memory cell with a first threshold value of the physical parameter and with a second threshold value of the physical parameter and identifying a relationship of the at least one physical parameter of the memory cell to the first threshold value and to the second threshold value. The method may also include associating one of a 0, 1, and X state to the memory cell based on the relationship of the at least one physical parameter of the memory cell to one of the first threshold value, the second threshold value, and both the first threshold value and the second threshold value and programming at least one state storage memory cell to store a programmed value corresponding with the associated 0, 1, or X state. The method may also include including the programmed value of the at least one state storage memory cell in a PUF data stream.

Implementations of a method of identifying a memory cell state for use in a PUF may include one, all, or any of the following:

Identifying a relationship of the at least one physical parameter of the memory cell may further include identifying a relationship of the at least one physical parameter of the memory cell to a third threshold value and to a fourth threshold value. The method may also include associating a 0, 1, X, or BX state to the memory cell based on the relationship of the at least one physical parameter of the memory cell to the first threshold value, second threshold value, third threshold value, fourth threshold value, or any combination thereof. The method may further include programming at least one state storage memory cell to store a programmed value corresponding with the associated 0, 1, X, or BX state and including the programmed value of the at least one state storage memory cell in the PUF data stream.

Programming at least one state storage memory cell may further include programming a first state storage memory cell and a second state storage memory cell. If the associated state of the memory cell is a 0, the method may include programming a 0 in the first state storage memory cell and programming a 1 in the second state storage memory cell. If the associated state of the memory cell is a 1, the method may include programming a 1 in the first state storage memory cell and programming a 0 in the second state storage memory cell. If the associated state of the memory cell is an X, the method may include programming a 0 in the first state storage memory cell and a 0 in the second stage storage memory cell or programming a 1 in the first state storage memory cell and a 1 in the second state storage memory cell. If the associated state of the memory cell is a BX, programming one of a 0 in the first state storage memory cell and a 0 in the second state storage memory cell or programming a 1 in the first state storage memory cell and a 1 in the second state storage memory cell.

Associating a 0, 1, X or BX state to the memory cell based on the relationship of the at least one physical parameter of the memory cell may further include associating the BX state to the memory cell if the value of the at least one physical parameter lies between both the first threshold value and third threshold value or both the second threshold value and the fourth threshold value.

The PUF data stream may be a PUF quaternary data stream including 0, 1, X, and BX programmed values.

The PUF data stream may be a PUF ternary data stream including 0, 1, and X programmed values.

The method may further include extracting from the PUF data stream the BX programmed values to form the PUF ternary data stream.

Implementations of a method of identifying a memory cell state for use in a PUF reference pattern and PUF comparison pattern may include comparing at least one physical parameter of a memory cell with a threshold value of the physical parameter and identifying a relationship of the at least one physical parameter of the memory cell to the threshold value. The method may further include associating a 0, 1, or X state to the memory cell based on the relationship of the at least one physical parameter to the threshold value, programming at least one state storage memory cell to store a programmed value corresponding with the associated 0, 1, or X state, and including the programmed value of the at least one state storage memory cell in a reference PUF data stream. In response to receiving an authentication request, only if the memory cell has a 0 or 1 state assigned, the method may include comparing the at least one physical parameter of the memory cell with the threshold value of the physical parameter. The method may also include re-identifying a relationship of the at least one physical parameter of the memory cell to the threshold value, re-associating a 0 or 1 state to the memory cell based on the relationship of the at least one physical parameter to the threshold value, and programming at least one state storage memory cell to store a programmed value corresponding with the re-associated 0 or 1 state. The method may include including the programmed value of the at least one state storage memory cell in a comparison PUF data stream.

Implementations of a method of identifying a memory cell state for use in a PUF reference pattern and PUF comparison pattern may include one, all, or any of the following:

A method of authenticating a device using the reference PUF data stream and the comparison PUF data stream may include retrieving the PUF reference pattern stored in one of a plurality of memory cells used to generate the PUF reference pattern, a secure storage memory coupled to the plurality of memory cells, or any combination thereof, and receiving a PUF comparison pattern from a device seeking authentication. The method may include comparing the state values of the reference PUF pattern with the state values included in the comparison PUF pattern, and, if the state values of the PUF comparison pattern match the state values of the reference PUF pattern above a predetermined threshold value, then approving authentication of the device.

Comparing the state values of the reference PUF pattern with the state values including the comparison PUF pattern may further include comparing using a ternary content addressable memory (TCAM).

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 1 is a table view listing various PUF function pattern processes that can be generated using various memory types;

DESCRIPTION

This disclosure, its aspects and implementations, are not limited to the specific components, assembly procedures or method elements disclosed herein. Many additional components, assembly procedures and/or method elements known in the art consistent with the intended physically unclonable function (PUF) generating systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such physically unclonable function generating systems and method implementations, and implementing components and methods, consistent with the intended operation and methods.

PUFs form a set of cryptographic primitives used in authentication/cryptographic methods. The underlying authentication mechanism in which PUFs are used is in generating Challenge-Response-Pairs/Patterns (CRP). PUFs that are unique to each device allow an authentication system to challenge a device seeking authentication, receive half of a CRP pair from the device, and then compare the received half with a stored CRP pair to verify whether a match takes place. Where the PUFs take advantage of the natural manufacturing variations unique to the device seeking authentication, a large number of Challenge (i.e. input) Response (i.e. output) pairs can be generated. The generation of CRPs may need to be reproducible, predictable, and easy to recognize during the authentication process for the CRPs to be useful.

In various authentication systems, the challenges are stored in a secure server coupled to the device being prepared for authentication. The device wishes to operate using resources to which access is controlled by the secure server, and so the secure server must approve authentication of the device in order for it to operate. Once generated during the initial portions of the authentication cycle, the PUFs are then used in challenge queries. Authentication is granted by the system when the rate of matching responses between the PUF generated CRPs is high enough above a threshold value. Weak PUFs generally only produce a satisfactory rate of responses far from 100% matching, while with strong PUFs the rate approaches 100%. Other criteria used to assess the quality of a PUF are, by non-limiting example, the size (in bits) of the CRPs, and the robustness of the responses with respect to temperature and voltage variations, electromagnetic interferences, and device aging. When PUFs are used, their nature creates a cryptographic expectation of randomness and uniqueness that should make good PUFs hard to extract and identify for unwelcome users, and easy to implement and use for secure authentication.

Figure 3:
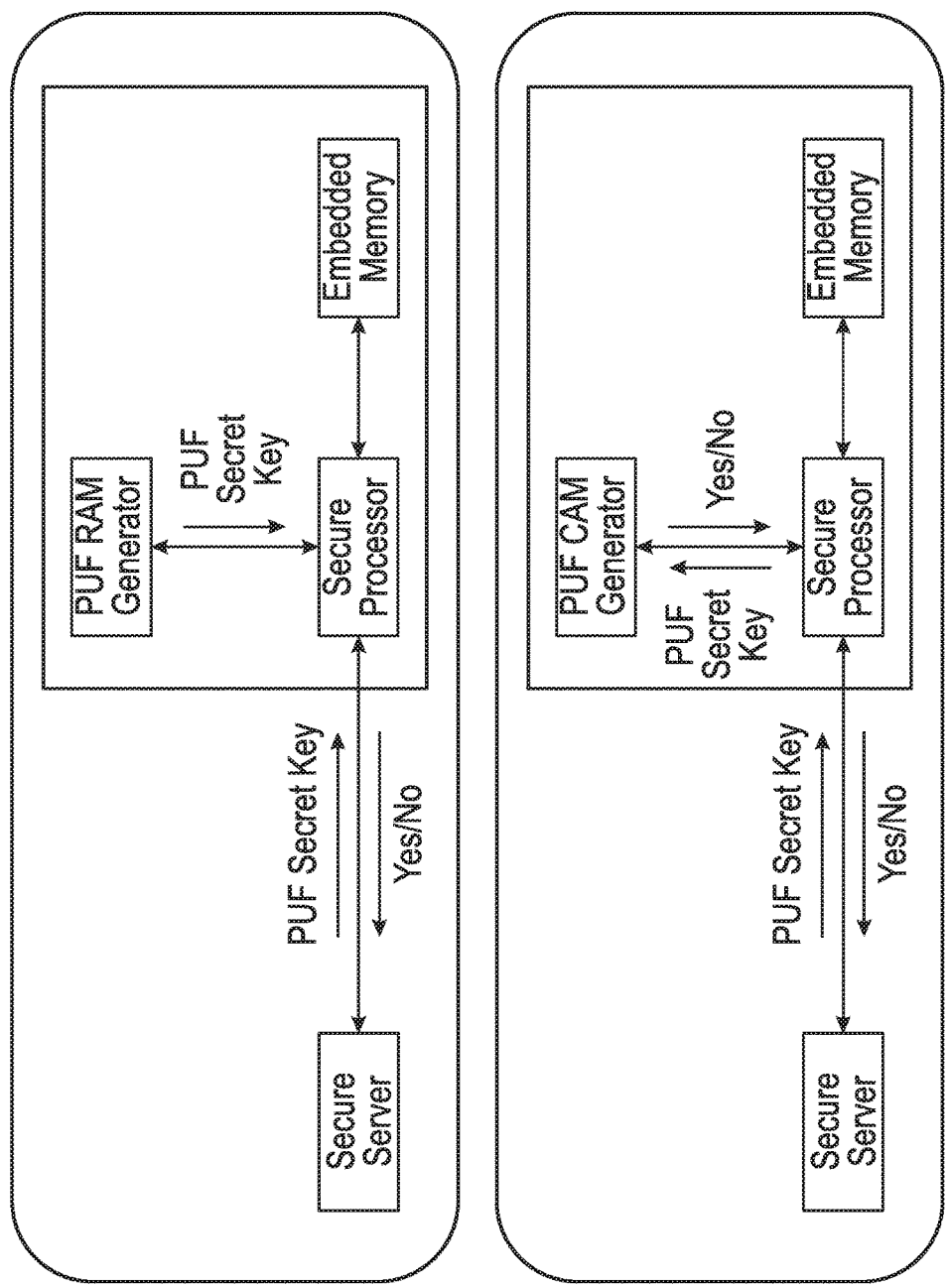
FIG. 3 is a block diagram of two PUF authentication method implementations.

FIG. 3 illustrates two implementations of authentication systems that utilize PUFs. With RAM based architecture (upper block of FIG. 3) the PUF keys are extracted from the PUF RAM memory generator and provided to the secure processor of the device seeking to be authenticated by the secure server. The secure processor then performs a comparison of this pattern with a stored PUF key provided for the authentication from the secure server. Content Addressable Memories (CAM) (lower block of FIG. 3) can directly perform the PUF key matching "in situ," which may further enhance the level of security over the RAM based authentication system. For example, when attacking a RAM based system, hackers will attempt to use bad keys to extract the PUF secret key transferred from the PUF memory to the secure element. However, since the PUF key matching is done directly between the CAM memory and the secure processor, this key extraction method will not work in a CAM based architecture.

In this document, PUFs are derived from analyzing intrinsic manufacturing variations of semiconductor devices that are created during the fabrication of the devices. Non-limiting examples of such variations that alter device characteristics include variations in critical dimensions, doping level(s) of semiconducting materials, threshold voltages, variations in lot-to-lot processing, and variations in wafer-to-wafer processing. These variations make each device unique, and identifiable from every other device, like a device fingerprint or biological DNA.

Conventional examples of PUFs generated using characteristics of semiconductor memories may be found in the following references: the paper by Vatajelu et al., entitled "STT-MRAM-Based PUF Architecture Exploiting Magnetic Tunnel Junction Fabrication-Induced Variability," *ACM Transactions*, V. 39 (July 2015); the paper by Prabhu et al., entitled "Extracting Device Fingerprints from Flash Memory by Exploiting Physical Variations," 4*th International Conference on Trust and Trustworthy Computing*, June 2011; the paper by Yamamoto et al., entitled "Variety Enhancement of PUF Responses Using the Locations of Random Outputting RS Latches," *J. Cryptogr. Eng.* V. 3, p. 192-211 (2013); the paper by Yamamoto et al., entitled "Uniqueness Enhancement of PUF Responses Based on the Locations of Random Outputting RS Latches," *Cryptographic Hardware and Embedded Systems CHES* 2011 *Lecture Notes in Computer Science*, V. 6917, p. 390-406 (2011); U.S. Pat. No. 5,434,917 to Naccache et al., entitled "Unforgeable identification device, identification device reader and method of identification," issued Jul. 18, 1995; U.S. Pat. No. 8,300,450 to Christensen et al., entitled "Implementing physically unclonable function (PUF) utilizing EDRAM memory cell capacitance variation," issued Oct. 30, 2012; and U.S. Patent Publication No.

20150071432 to Zhu et al., entitled "Physically unclonable function based on resistivity of magnetoresistive random-access memory magnetic tunnel junctions," filed Nov. 11, 2013; the disclosures of each of which are hereby incorporated entirely herein by reference.

Figure 2:
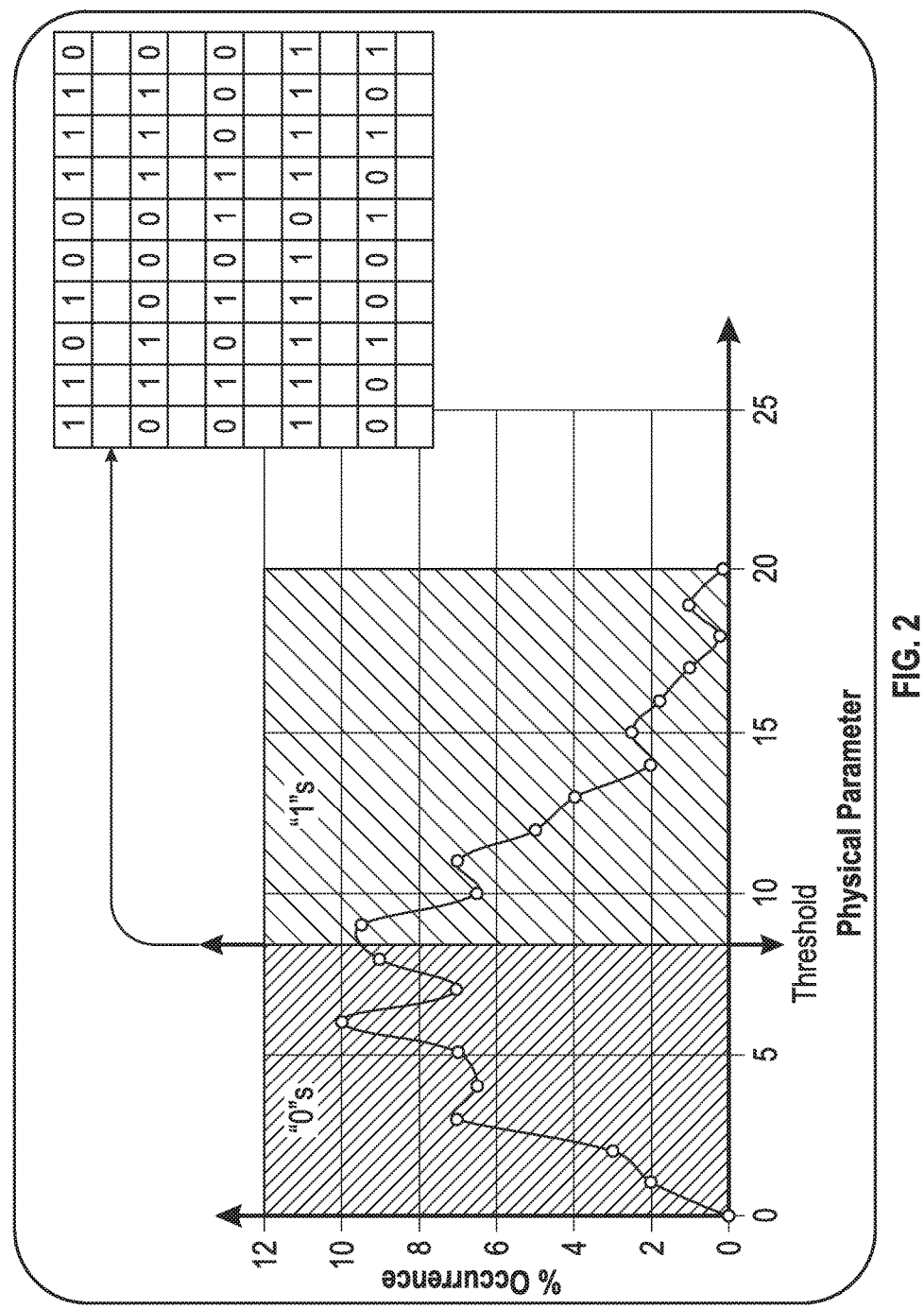
FIG. 2 is a chart showing values of a physical parameter for various memory cells in an array and an assignment of the memory cells as having 0 and 1 state values based on the relationship of the physical parameter to a threshold value.

Referring to FIG. 1, a table is shown that describes in brief summary form various methods for generating a PUF from various memory array structures. FIG. 2 is a chart showing values of a physical parameter for various memory cells in an array and an assignment of the memory cells as having 0 and 1 state values based on the relationship of the physical parameter to a threshold value. FIG. 2 illustrates how, for a particular physical parameter, memory technologies have a tipping points in their programming conditions, such that the likelihood of programming "0"s is the same as programming "1"s. Small manufacturing variations at the cell level (depending on the technology, see FIG. 1) can generate either "0"s or "1"s under various operating conditions. When the manufacturing variations that generate either "0"s or "1"s are tracked over a large number of cells this data can be used to create a digital signature exploitable as part of a PUF. FIG. 2 shows a threshold value, and it is to be expected that the cells falling close to the threshold value point are equally statistically likely to flip from 0 to 1 or 1 to 0 during startup and/or programming cycles. Furthermore, over time, cells with physical parameters close to the threshold value are likely to drift in different directions (i.e., in their likelihood of being 0 or 1) after being subject to aging, temperature and voltage changes, or electromagnetic interferences.

One way to create PUFs used in CRPs for various memory devices is to generate the PUFs (for use as challenges) during the power up cycles of the devices, then temporarily store them in the same memory that was used to generate the challenge or in another secure embedded memory coupled with the memory. During use, the responses to the generated and temporarily stored challenges are provided to the secure server during the authentication process using a secure processor in the device seeking authentication. All electronics-based cryptographic solutions have intrinsic weaknesses that can potentially be exploited by crypto-analysts using methods such as Differential Power Analysis (DPA), or electromagnetic probes. This is because processing "0"s and "1"s tends to generate different electric currents that are particularly visible during programming and reading cycles of a memory. PUFs are more difficult to detect using these techniques, however, because they do not involve ongoing programming and reading steps during operation—the only time a PUF is stored, read, or processed is during power up or at the time an authentication is attempted. Because these are not regular events, it will be more difficult for such cryptoanalytic methods to be useful absent real-time knowledge of what the authentication system is doing at a point in time.

To reduce exposure to side channel attacks using techniques such as differential power analysis, system implementations disclosed herein pair "0"s and "1"s together to create a "0, 1" pair as a "0", and a "1, 0" as a "1". This is because logic processors consume the same current to process a "0, 1", as a "1, 0". The states "1, 1", and "0, 0" are byproducts of logic architecture, and can be used in various implementations for processing using ternary logic. Ternary logic has been used in the process of dispatching Internet Protocol (IP) packets through routers. Ternary Content Addressable Memories (TCAMs) dispatch the packets where the ternary state also referred as "no cares" is formed by blanking part of the IP addresses. It has also been reported that these additional states can be used for cryptographic purposes. The use of a PUF with ternary values (0/1/random) increases the entropy of the PUF, in in some conventional systems, latches and additional circuitry were added to sort out random memory cells, and store the ternary states of the PUF. Assuming that a PUF has "n" challenges, the number of possible states (i.e. the entropy) of a binary PUF is $2^n$ while the entropy of a ternary PUF could reach $3^n$.

If a PUF is based on data collected from a memory that contains a high enough ratio of marginal cells close to the threshold value in FIG. 2, a weak PUF will result. Error detection and error correction algorithms can be used to counteract this to enhance the strength of PUFs. However, systems that minimize the number of marginal cells used to generate the data used in a PUF will fundamentally result in a stronger PUF. As illustrated in FIG. 1, each memory type used for PUF generation uses different physical principles. When "0"s and "1"s are created based on a single arbitrary threshold as illustrated in FIG. 2, the (marginal) cells located close to the transition value are unstable, and can switch back and forth between 0 and 1 over time, subject to thermal variations, aging, or other electrical noise interactions. The ratio of marginal cells that are not reliable for the generation of a strong PUF pattern is typically in the about 5 to about 20% range based on conventional manufacturing techniques. Since PUFs disclosed herein leverage the small micro-manufacturing variations cell to cell, these unpredictable and unstable patterns will weaken the strength of the PUFs.

Figure 4:
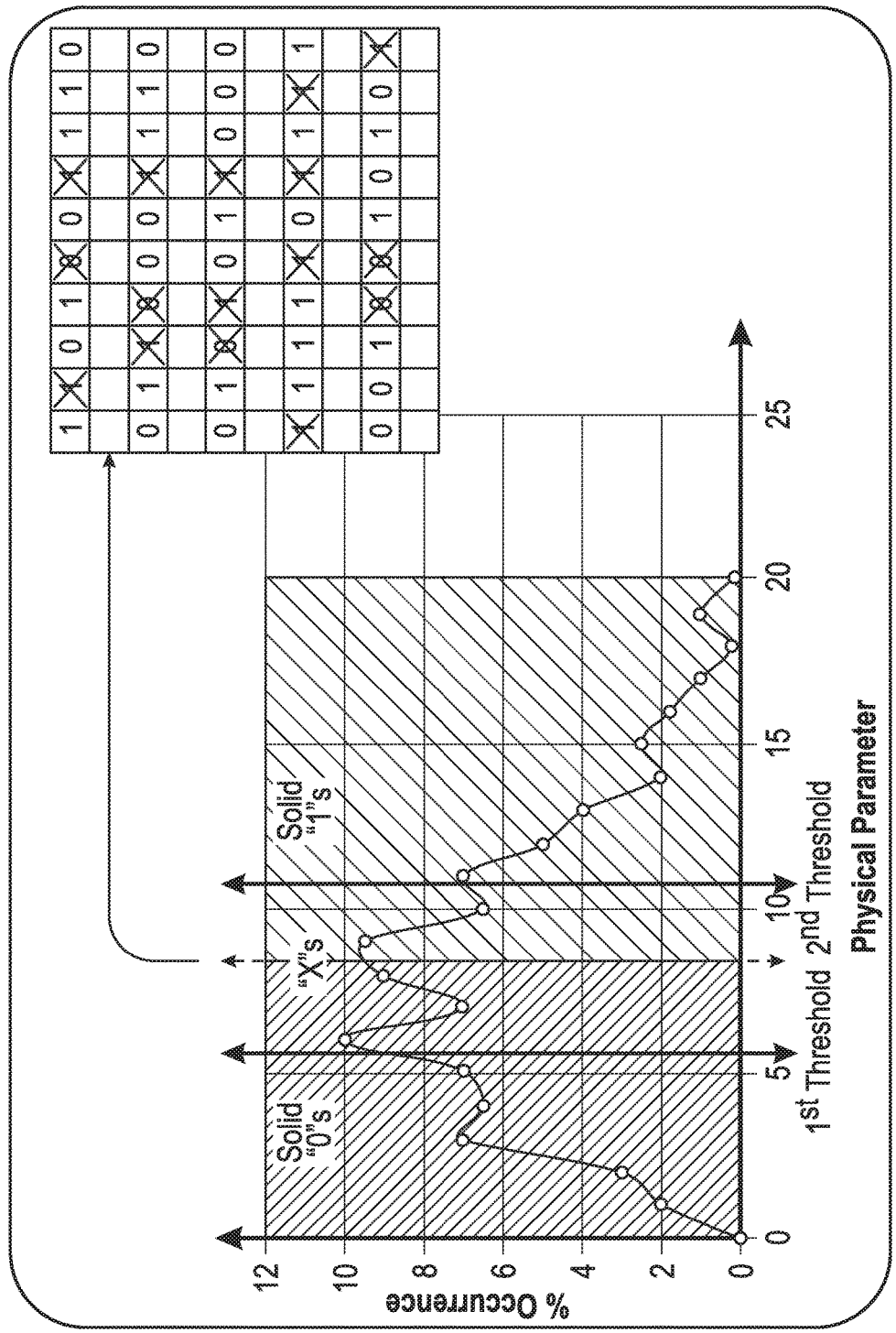
FIG. 4 is a chart showing values of a physical parameter for various memory cells in an array and an assignment of the memory cells as having 0, 1, and X (ternary) state values based on the relationship of the physical parameter to a first and a second threshold values.

FIG. 4 is a chart showing values of a physical parameter for various memory cells in an array and an assignment of the memory cells as having 0, 1, and X (ternary) state values based on the relationship of the physical parameter to first and second threshold values. FIG. 4 also illustrates a technique for using ternary values to handle marginal cells. This method begins by identifying three types of cells in the memory being analyzed: the ones that are solidly a "0" far away from the transition point between the first and second threshold value, the ones that are solidly a "1" also far away from the transition point, with remaining ones between the first and second threshold values being given a ternary state value "X". The objective of the method is to increase the probability of a solid bit, 0 or 1, to remain stable and predictable over the life time of the memory. In various implementations, the first and second threshold values may be set to enable PUF authentication failure rates typically below the part per million range as is achieved in commercially available memory product manufacturing process. The cells to be blanked by an "X" state include the cells that are too close to the transition point based on a particular physical parameter value associated with the cell. In various implementations, the cells to be blanked by the X state value can also include cells that are not reliable. Methods to test the quality of the cells are known, can be quite slow, and typically last a few seconds. For example, an existing BIST (Built In Self-Test) module/process could be implemented as a testing system and the data from the test used to identify marginal cells along with information about the particular physical parameter(s) being used to for comparison with first and second thresholds. By identifying the marginal/transition point cells, and blanking them with an "X" state, the method increases the quality of the data stream of the remaining "0"s and "1"s that are generated by the memory used for the PUF values. Unlike some conventional systems, there is no need for external circuitry to store the "X" state, as the memory used to generate the PUF itself can store the three states (0, 1, X), as described herein.

Various methods of identifying, storing, and using ternary (and quaternary) states in memory cells for use in a PUF are possible using the principles disclosed in this document. Those system and method implementations disclosed herein are for the non-limiting exemplary purposes of this disclosure and those of ordinary skill will readily appreciate how to apply the principles disclosed herein to other system and method implementations.

Figure 5:
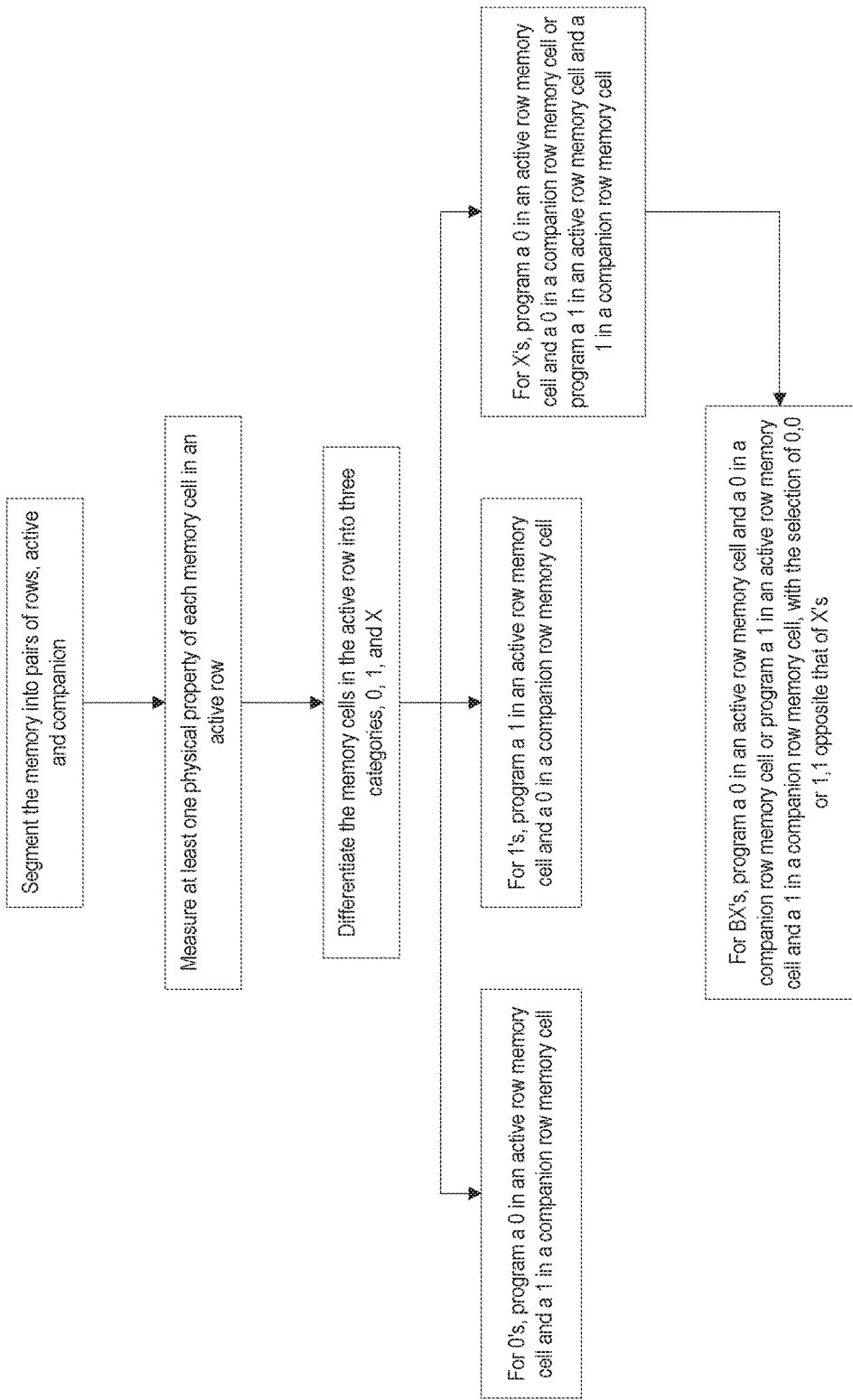
FIG. 5 is a flow chart of an implementation of a method of generating a PUF pattern from a memory.

Referring to FIG. 5, an implementation of a method of generating a PUF pattern (challenge/response pair) is illustrated. Initially, the memory is configured. The memory is segmented by pairs of rows. The cells of the first row of each pair, referred as the "active row", are the ones in which characterization is carried for generating PUF patterns, and also, in some implementations, where the resulting PUF patterns used for challenges are stored. The cells of the second row of each pair, referred as the "companion row", are the cells where complementary information (state values, categories) is stored to describe the three elementary states, 0, 1, and the third state "X". In some implementations to be discussed hereafter, like the systems illustrated in FIG. 13, it is also possible to segment the memory by pairs of columns (active and companion) rather than by pairs of rows where an active column, and a companion column is likewise included for each pair.

The method also includes using the system to measure the physical parameters of the cells in the active row. In some implementations, this information may already be stored in the memory or in another memory coupled to the system and may be retrieved rather than being directly measured, depending on the type of physical parameter being used. This process involves making a determination of the status of all cells of the active rows, i.e. that each cell is, based on its read state and how close a physical parameter(s) of the cell is to first and second threshold values (and third and fourth threshold values) for that parameter(s), a "0", a "1" or a "X" (and BX where third and fourth threshold values are used as described hereafter). The sorting processing may be lengthy, depending upon the method used to evaluate the status of the cells and/or the physical parameters of the cells. In some implementations, fewer than all of the cells in the active rows could be evaluated.

The method includes using the system to write/program the solid 1 and 0 cell values to memory. These values may be written to the same memory being analyzed or may be written to an external memory in various implementations. Where external memories are used, the values may be themselves encrypted. Since the method creates a data stream that includes only the solid 1 and solid 0 values, only "0"s and "1"s need to be stored in the memory cells. Accordingly, any memory technology can be used for storage, even if it is structurally different from the one being analyzed. When a particular cell of an active row has been characterized as a solid "0", a "0" is programmed in this cell, and a "1" is programmed in the companion cell. In a similar way, a solid "1" is programmed as "1" in the active row, and a "0" in the companion row. All remaining cells that do not yield solid bits are programmed with a ternary state, an "X", with both bits in the active row and the companion row being identical, either a "0, 0" or a "1, 1". In various implementations of the method, it is possible to program only "0, 0"s, only "1, 1"s, and/or to alternate between the two.

Figure 6:
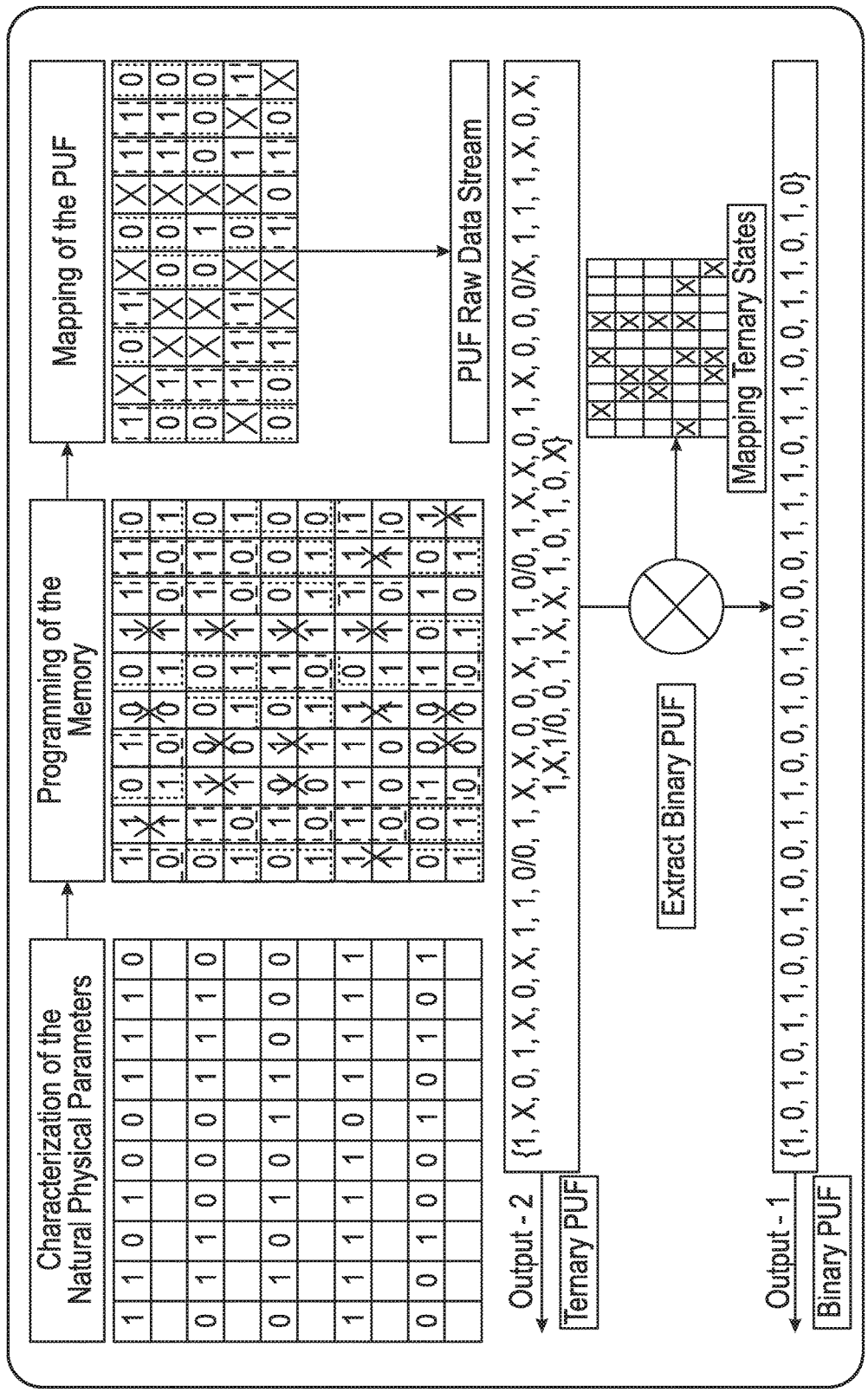
FIG. 6 is a diagram showing the various steps carried out in a method of generating a ternary PUF data stream and a binary PUF data stream.

Referring to FIG. 6, with the mapped ternary state data, the method includes generating a PUF data stream (PUF Raw Data Stream) using the 0, 1, and X values stored in the memory. After the programming operation, the basic 3 states that may be kept in the memory for the purpose of PUF pattern generations are "0"s (the pair "0, 1"), "1"s (the pair "1, 0"), and, in some implementations, the "X"s (either the pair "0, 0", or the pair "1, 1"). As a result of this process, two types of PUF patterns can be generated by the system. The first is a PUF binary data stream (Output 1). The mapping of the "X"s is extracted and kept stored in the memory of the device being analyzed for use in future authentication, while the data stream transmitted to the secure server is the pure binary 1 and 0 pattern of the solid 1s and 0s. Because these binary values are based on solid 1s and 0s and may include nearly no marginal cell values, this data stream may be solid and strong, and ready for use to provide clear authentication of the device being analyzed. The second PUF data stream that can be generated is a PUF ternary data stream. If the secure process can handle ternary data streams, such a data stream would offer additional security features above a binary data stream as discussed previously, as the entropy of the PUF pattern is increased accordingly.

Figure 7:
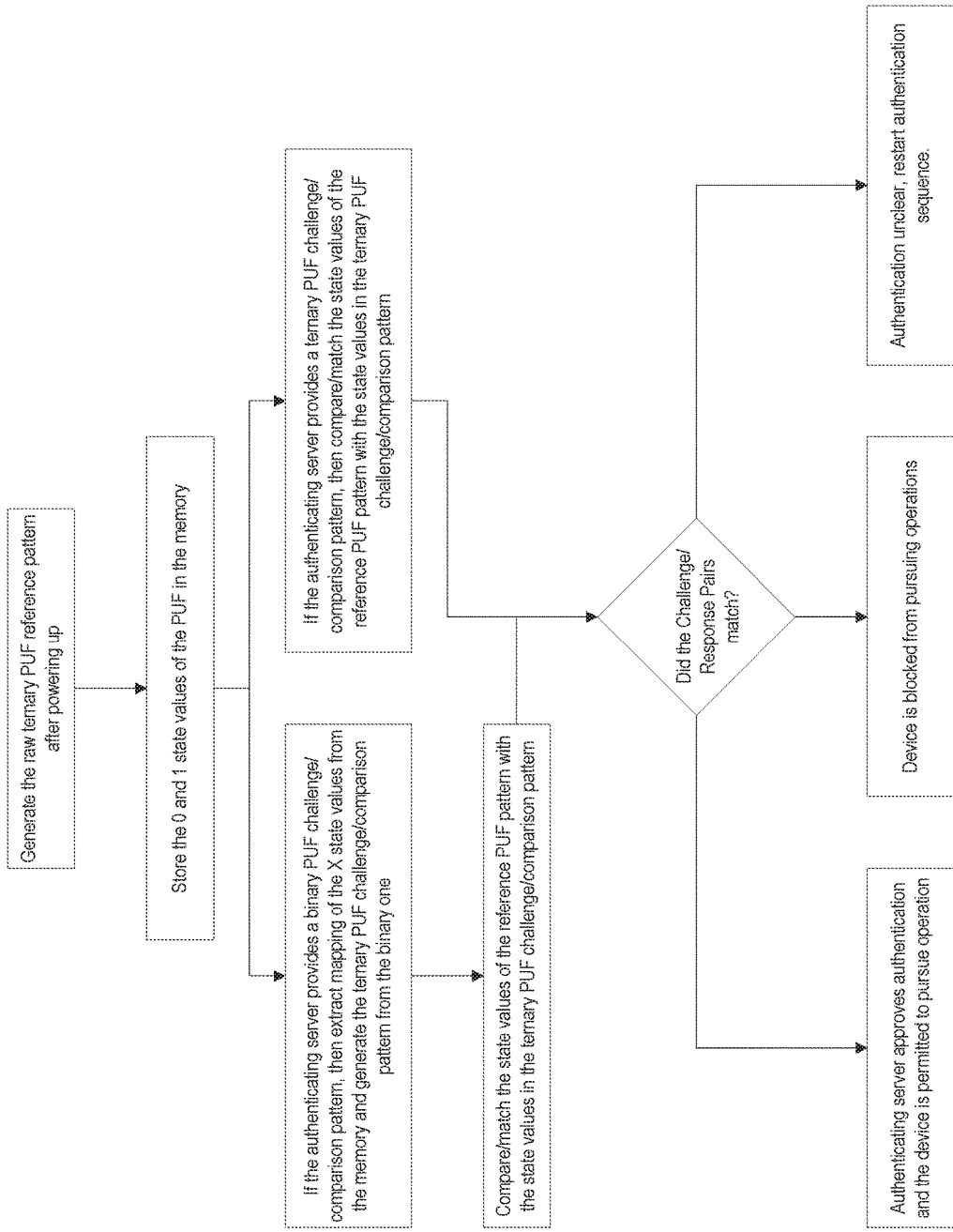
FIG. 7 is a flow chart of a method implementation of authentication using PUF challenge/response pairs/patterns.

Referring to FIG. 7, a flow chart of an implementation of a method of authenticating a device using a physically unclonable function is illustrated. The method may include preparing the PUF reference pattern after powering up the memory being analyzed. If the memories that generate the PUF patterns are non-volatile, these memories can be erased when the device is powered up. During the power-up cycle, the PUF reference pattern is generated using any method disclosed in this document and then stored in the secure server. Following generation of the pattern, the PUF reference pattern (response pattern) generated by the PUF memory, and the one brought by the secure server received from the device seeking authentication (the PUF comparison pattern, challenge pattern) are compared for the purpose of testing the level of matching between both patterns. This matching can be done at the binary level, or at a ternary level. Due to the strong quality of the binary data stream it is expected that the authentication signal resulting from the matching (or not) of the PUF reference pattern from the server with the PUF comparison pattern provided by the device will be strong. In case of a mismatch, the likelihood that the cause of the mismatch is coming from the poor quality of the PUF patterns should be low and that the mismatch is instead an intrusion attempt. The consequences of a mismatch are set out in FIG. 7. As can be seen, one of the options if the authentication is unclear is for the device to restart the authentication sequence, which could include generating the raw PUF comparison and or reference pattern again or merely restarting the comparison process between the two patterns again.

Figure 8:
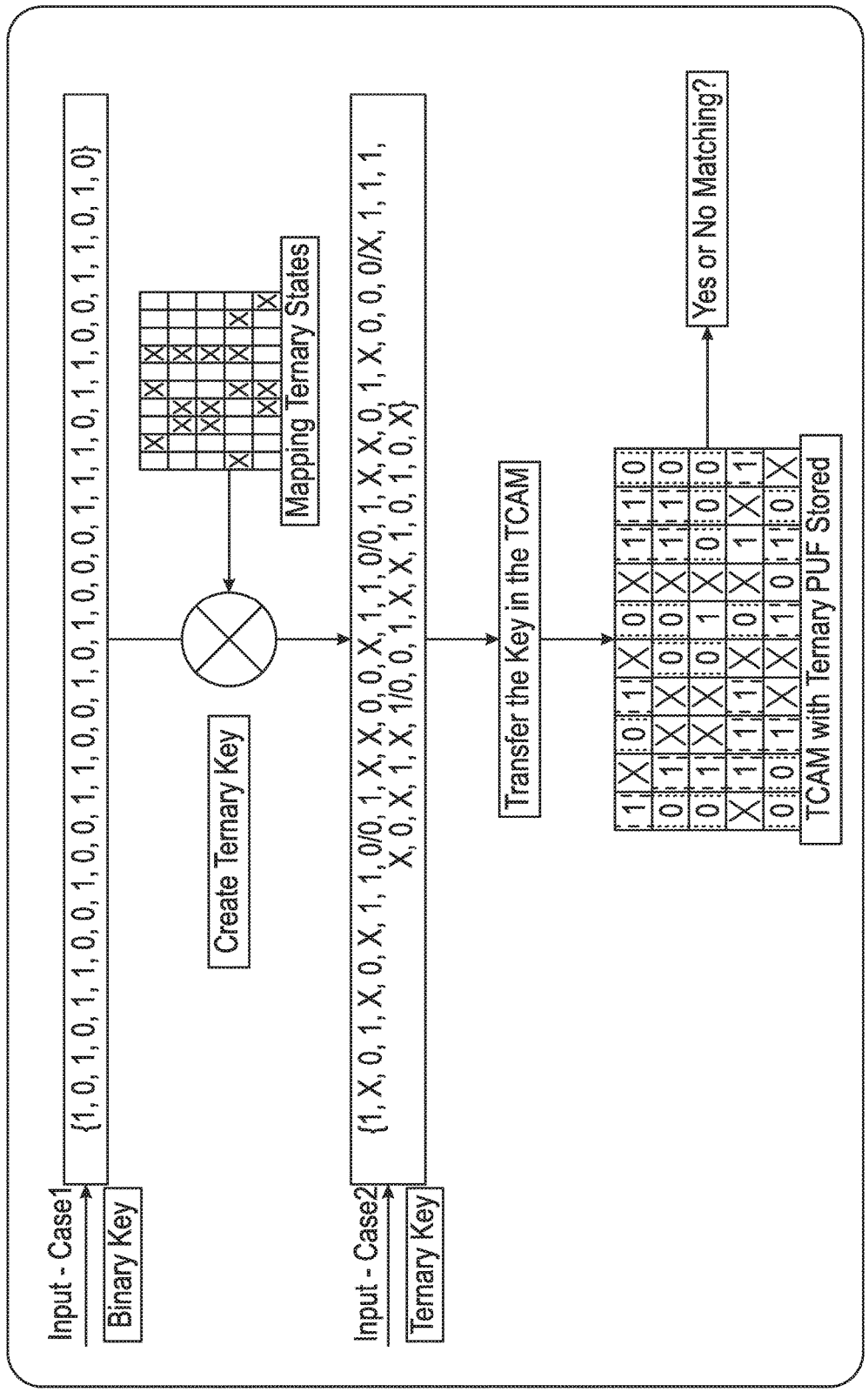
FIG. 8 is a diagram illustrating the various steps carried out in a method of authenticating using a binary PUF data stream and a ternary PUF data stream and a ternary content addressable memory (TCAM)

Referring to FIG. 8, illustrates how the authentication can be done using a TCAM. As previously described herein, the authentication can be done by extracting the PUF reference pattern from a RAM for data matching, or by comparing the PUF reference pattern provided by the secure server directly in a CAM. In the authentication process illustrated in FIG. 8, the ternary data streams are transferred directly in a TCAM PUF memory for data matching. Such authentication process may be difficult to break using side channel attacks such as DPAs as discussed previously.

Various system and method implementations may utilize methods of enhancing the level of cryptographic security of the PUF pattern generated. In a first method implementation, the entropy of the PUF is increased. If, for example, the PUF has 128 bits of which 16 are potentially unstable, the level of certainty of a matching could fluctuate between 87% (112/128) and 100%. Conventional systems that use ternary state (0, 1, random) potentially increase the entropy from $2^{128}$ to $3^{128}$ ($3^{128} \approx 2^{(128 \times 1.58)}$) however conventional systems require the overall system to comprehend and handle ternary logic to achieve this. The stability of the third states, the random ones, is not necessarily as good as the stability of the "0"s and the "1"s, so an entropy of 3" is only a best case, and only assuming the three states are equivalent, which is not practically the case.

A first method implementation involves setting aside an increased portion of a memory used to generate PUF patterns for use in challenges. In various implementations, this can be done in such a way that the size of the active PUF pattern can be kept at a preferred/predetermined level after blanking. For example 150 bits can be set aside to leave 128 clean bits after the blanking of 32 "X" bits. The objective is to raise the probability of a matching signal during authentication to close to 100%. It is expected that if the screening process is appropriate, the 128 bits left are predictable, reproducible, and fully authenticable. The important criteria is the stability of the "1"s and "0"s, not the stability of the "X"s because they are blanked. The "X"s can then actually be tested as "1"s or "0"s and alternate between these states without impacting the authentication cycle. The logic circuitry supporting this PUF memory outside the direct control circuitry can be purely binary. This method implementations allows the reuse of existing system solutions including the secure server, cryptographic methods, and operating software to carry out the binary operations as disclosed herein.

Figure 9:
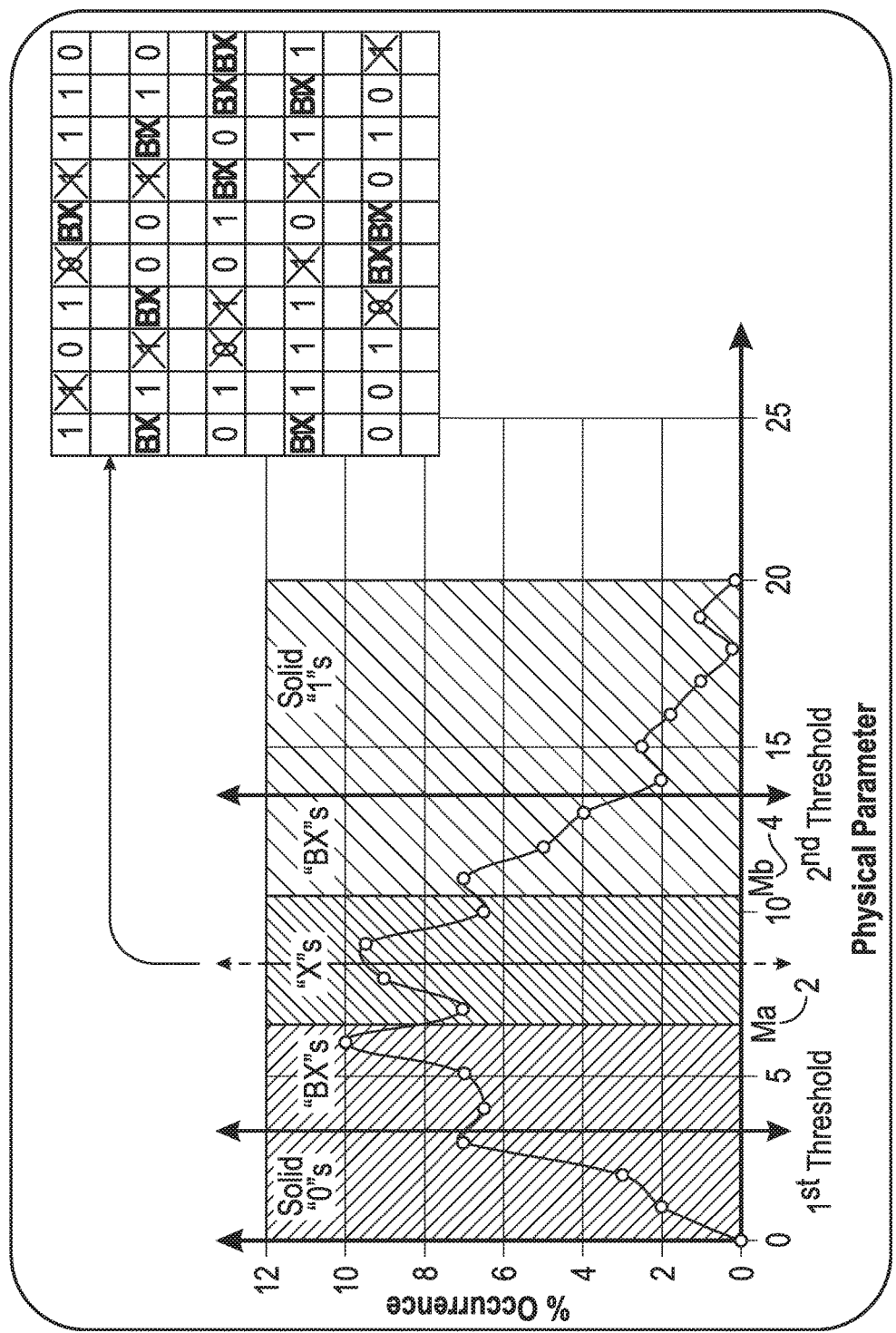
FIG. 9 is a chart showing values of a physical parameter for various memory cells in an array and an assignment of the memory cells as having 0, 1, X, and BX state values based on the relationship of the physical parameter to a first, second, third, and fourth threshold values.

Referring to FIG. 9, a chart is illustrated that shows values of a physical parameter for various memory cells in an array and an assignment of the memory cells as having 0, 1, X, and BX state values based on the relationship of the physical parameter to a first, second, third, and fourth threshold values. A second method implementation of improving the entropy of the PUF pattern involves taking advantage of the quaternary states created by the logic of the method implementations of generating PUF patterns disclosed herein and illustrated in FIG. 9. This logic is quaternary with four distinct states "0, 1", "1, 0", "1, 1" and "0, 0". It is possible in various implementations to take advantage of this quaternary system, and to differentiate the cells that are consistently in the middle of the physical distribution as illustrated in FIG. 9, versus the ones that are in a buffer zone. The cells that are in the middle zone between the transitions points Ma and Mb can be referred as the real/solid "X"s, and be programmed with the state "0, 0" or "1,1". These cells located in the buffer zones can be referred as "BX" between the third threshold (Ma) 2 and the first threshold and between the fourth threshold (Mb) 4 and the $2^{nd}$ threshold. These cells can be programmed with the state "1, 1" or "0,0" depending on the implementation. In this case, the expectation is that the states "0"s, "1"s and "X"s are solid, predictable, reproducible, and authenticable while the "BX" states become the ones that are used to blank part of the memory. Back to the previous example, the size of the set aside memory used to generate the PUF can be increased to 256 bits to leave 128 bits that are solidly "0"s, "1"s, or "X"s, with the balance 128 bits to be blanked as "BX". Such a method implementation is capable of generating a strong ternary PUF with an entropy of 3" ($3^{128}$ for this PUF pattern). Furthermore, the use of the quaternary state BX can act as an error correction method that enhances the quality of the PUF generated pattern, and also subsequent operations such as pattern matching and authentication. Such method implementations could supplement or partially replace other ECC methods and simplify pattern processing operations. The ternary state X can similarly be used as an error correction method.

Other implementations of methods for increasing the cryptographic strength of the PUF patterns include a method of programming "0"s and "1"s to reduce side channel attacks. In the method, the "0"s are programmed as "0, 1"s, and the "1"s as "1, 0"s, so the measurements of the electric currents generated during authentication cannot differentiate the "0"s and the "1"s. If the ratio of "X"s is kept constant for all PUF patterns generated using the methods, side channel attacks based on power analysis such as DPA cannot easily extract the patterns during authentication, as the current generated by all the patterns will look essentially the same.

In various methods, error detection and error correction methods may be used in conjunction with the methods used to generate PUF patterns and/or with the methods of authenticating PUF patterns. The memory generating PUF patterns can benefit from error detection/error correction when done prior of the PUF pattern generation to improve the quality of the patterns. Error detection/correction can also be done during the pattern generation cycles, or subsequent operations such as matching or authentication cycles. The usage of ternary states or quaternary states to blank the bad cells can also act as an effective error correction step, further enhancing the strength of the PUF, by reducing the need to implement error management systems that can slow down operations, and potentially facilitate side channel attacks.

Additional techniques for encrypting the stored PUF reference pattern may be used in various method implementations. For example, additional X state values obtained from a cryptographic key or pin code may be inserted into the memory array to distort the stored pattern. These additional X state values may be then subtracted during the authentication cycle to restore the original pattern. Many other algorithms for use in encrypting/decrypting the stored PUF pattern may be used in other implementations.

Method and system implementations disclosed herein may use any of a wide variety of memory types. Some non-limiting examples are disclosed herein in the following sections.

Figure 10:
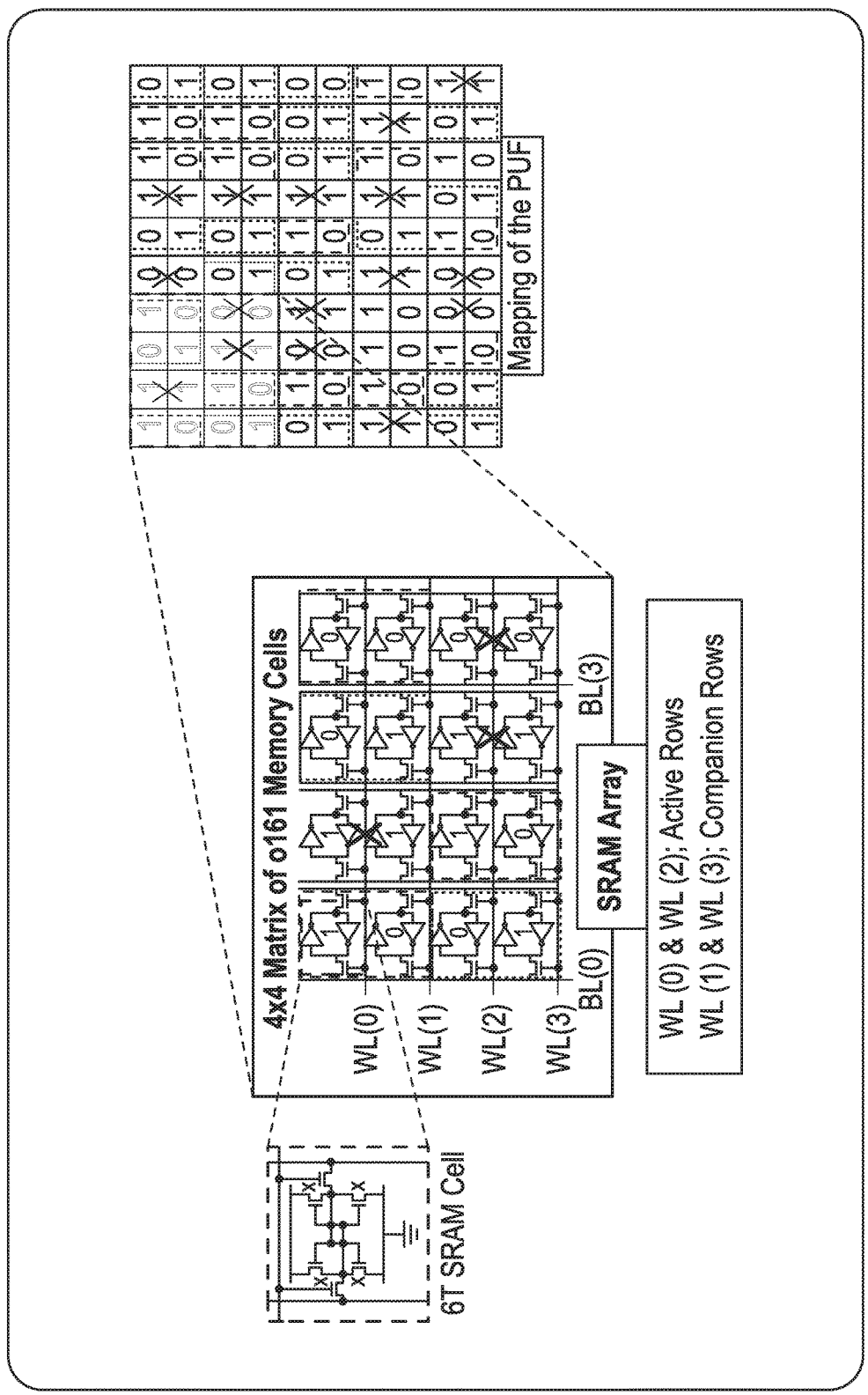
FIG. 10 is a diagram showing an implementation of a static random access memory (SRAM) and how a PUF pattern implementation can be mapped using the SRAM implementation.

SRAM and TCAM Memories:

Referring to FIG. 10, during power on cycles, the 6T-cells of the SRAMs randomly flip as ones or zeros due to small variations in the micro-manufacturing of the memory, a feature that can be used to generate PUF patterns. As described herein, in various method implementations, the active row of each pair of rows of the memory used for characterization is used for the purpose of generation of "0"s and "1"s, while the companion row is programmed to define the three states "0", "1", and "X". In the case of "0"s and "1"s, the companion rows are used to store the opposite bits of the one stored in the active rows as previously described. In case of "X"s, identical bits are stored in the active rows and in the companion row. FIG. 10 shows an example where 1, X, 0, 1 is stored in the first pairs of two rows, and 0, 1, X, X in the second pairs of two rows. In this embodiment (applicable to any commercial SRAM technology) the total number of cells needed to store a PUF pattern with n bits is 2*n.

Figure 11:
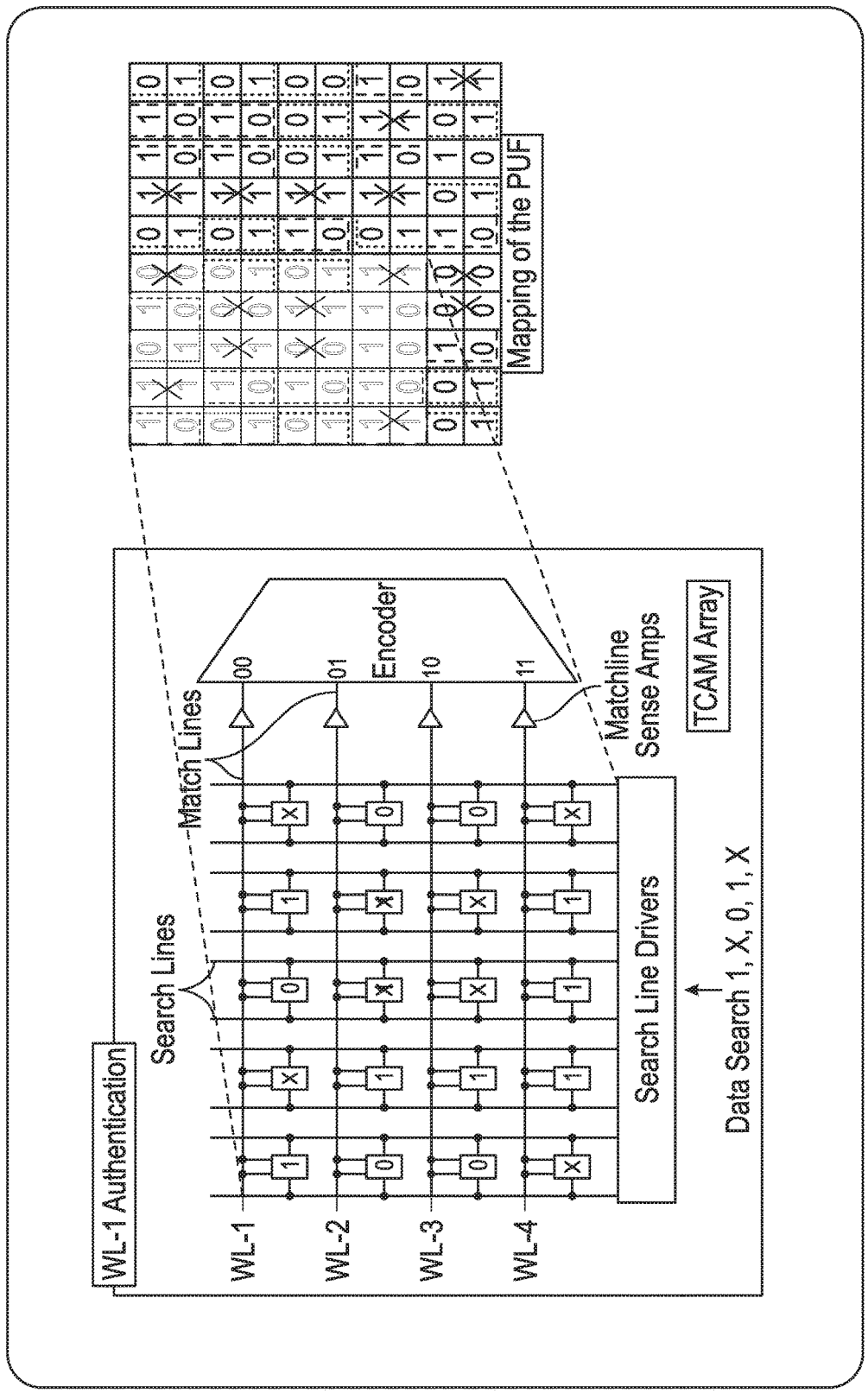
FIG. 11 is a diagram showing an implementation of a ternary content addressable memory (TCAM) and how a PUF pattern implementation can be mapped using the TCAM implementation.

Referring to FIG. 11, in a similar way, SRAM based TCAMs with 6T cells can generate PUF patterns as well. One side of the TCAM cells, the one used to store reference patterns, can be foundational for the generation and storage of PUF patterns. During power up cycles it can be determined which cells of the array consistently flip to a "0", a "1", or should be blanked as an "X". The other side of each TCAM cell, the one used to load the input (PUF comparison) patterns before in situ matching/comparing, can be used to store the PUF reference pattern provided by the secure server. Both patterns can then be compared as part of the authentication process. FIG. 11 is an example of an embodiment of the method using a in a TCAM system. The data search (1, X, 0, 1, X) is stored in the first row of TCAM cells, and is compared at once with the input pattern (1, X, 0, 1, X). In this way, the authentication process operates faster, and becomes less susceptible to side channel attacks when TCAM cells are used.

Figure 12:
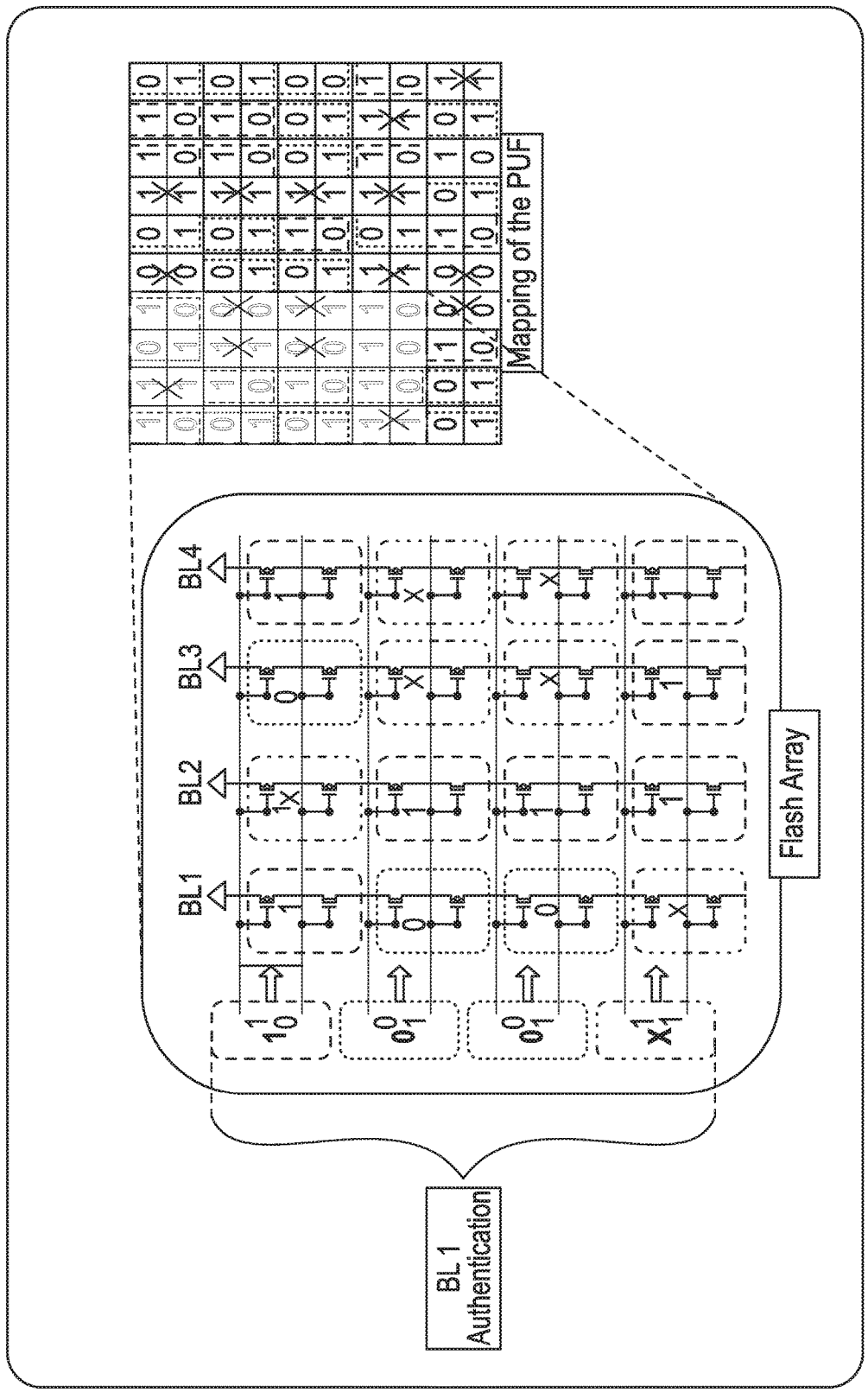
FIG. 12 is a diagram showing an implementation of a flash memory and how a PUF pattern implementation can be mapped using the flash memory implementation.

NAND Flash Memory:

Referring to FIG. 12, an example of an implementation of a method of forming PUF patterns using floating gate NAND flash is illustrated. One of several ways to generate PUF patterns with flash memories is to perform fixed time programming of the floating gates, and to stop programming at the tipping point between the "0"s and the "1"s where the probability to have each state is around 50%, which leaves the final state subject to manufacturing variations. The programing of a "1" from a "0" state is done by trapping a negative charge within the floating gate. The strong "1"s are programmed with the pair "1, 0" on the active/companion rows, the strong "0"s with the pair "0, 1", and the "X"s with the same bit on the active row and on the companion row (1, 1, or 0, 0). The input patterns for authentication are brought through the word lines in the form of input voltage: "1"s have a voltage on the word line higher than the threshold voltage required to make the flash transistor conductive; "0"s have a voltage lower than the threshold voltage of the flash transistors that have been charged with electric negative charges (these transistors were programmed as a "1"), but the voltage is high enough to make the un-charged transistors (the ones programmed as "0") conductive.

Figure 13:
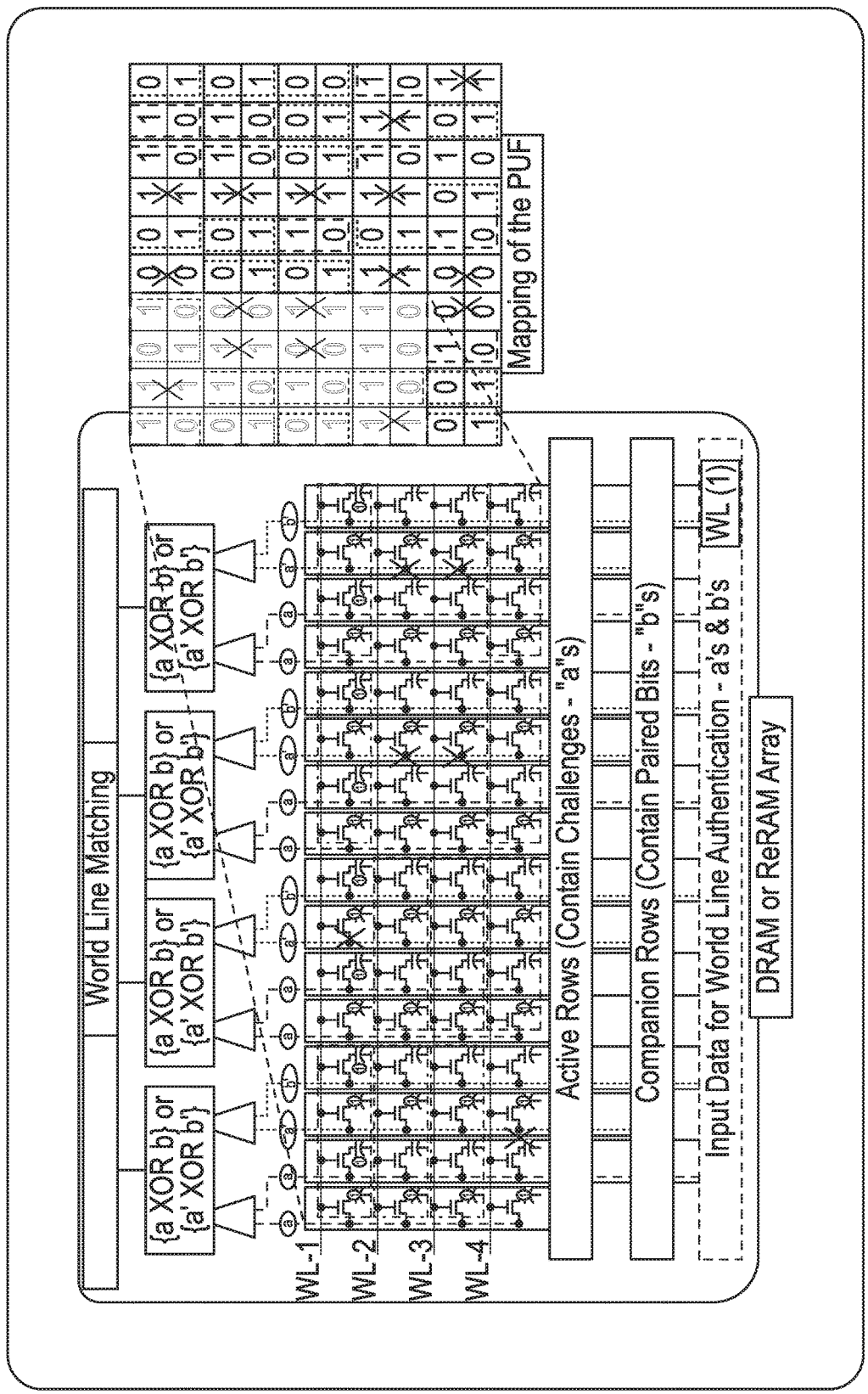
FIG. 13 is a diagram showing an implementation of the circuitry for a dynamic random access memory (DRAM) or a resistive random access memory (ReRAM) and how a PUF pattern implementation can be mapped using such memories.
Figure 14:
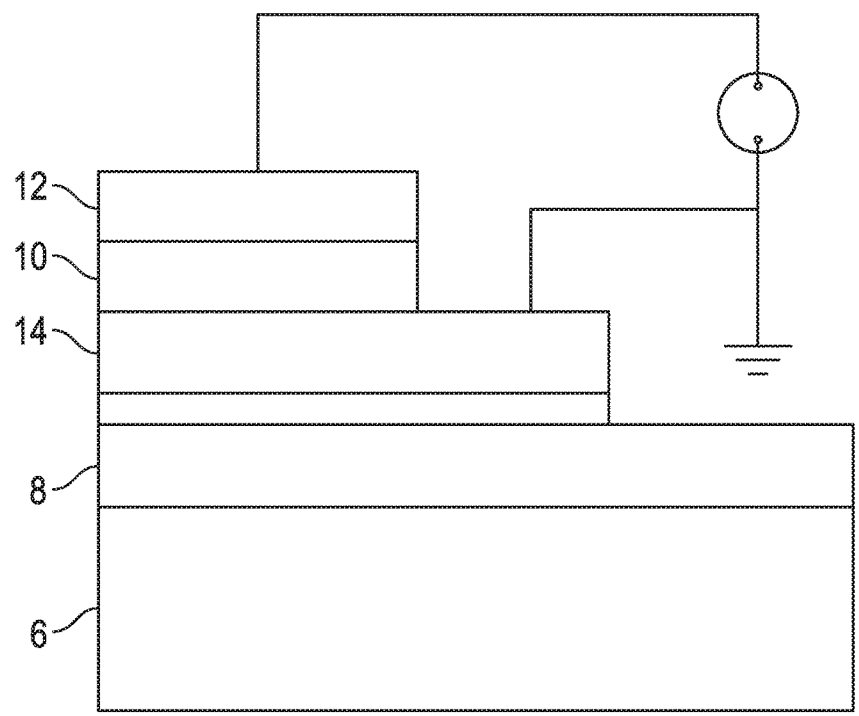
FIG. 14 is a cross sectional view of a ReRAM implementation.

In various method implementations, the match or not of an entire bit line can be tested at once; the impedance of the bit line is low only when the information stored in the cells matches with the electrical signal entered through the word lines. FIG. 12 illustrates that the pattern (1, 0, 0, X) is entering through the word lines where it has been stored in the first bit line. A single mismatch in the NAND chain triggers a high impedance state of the chain. Such an implementation of the method creates a very dense implementation of a PUF with ternary states using CAM authentication. The size of the memory array in such an implementation will be only twice the size of the PUF pattern. Other floating gate or charge trapping memory technologies can also be used with such a PUF pattern method implementation, and be similarly described by a block diagram similar to the one illustrated in FIG. 12. These include, by non-limiting example, NOR Flash memories and EEPROMs. DRAM and ReRAM Memories:

Referring to FIG. 13, DRAM cells contain capacitors that selectively trap an electric charge to differentiate the 1s (charged) from the 0s (uncharged). One method implementation for generating a PUF pattern using a DRAM cell is to charge all the cells, disconnect the refresh cycle, and let the natural leakages drain the DRAM cells during a fixed amount of time that is at the tipping point between the zeros and the ones; the probability of getting a "0" or a "1" should be close to 50% at this tipping point. The cells that then are programmed as "1"s are the ones with enough electric charge left to be tested as a solid "1", the "0"s are the ones with the lowest electric charges left, the "X"s are the ones in the buffer zone (between the various thresholds as discussed herein). Such a mapping can be used with any method implementation for generating PUF patterns disclosed in this document The resistivity of a Resistive Random Access Memory (ReRAM) cell is designed to be high. During programming cycles, the resistivity of the ReRAM cells typically drops several orders of magnitude. One way to generate a PUF pattern is to record the natural variations in the resistivity of the cells after programming; the higher resistivity values can be programmed as "1"s, the rest as "0"s or "X"s and used according to the methods disclosed herein.

Referring to FIG. 13, implementations of a method of generating PUF patterns and of authenticating PUF patterns using DRAM or ReRAM memories is illustrated. The first columns, the active columns, are the ones where "0"s and "1"s are generated, which can become the PUF patterns (challenges). The third columns, the companion columns, are the ones where the additional bits are stored to differentiate the "0"s, "1"s, and "X"s. The second and fourth column are available to enter the reference pattern from the secure server for the authentication cycle. All patterns in word line 1 can be checked for matching at once. Word Line-1 contains the pattern (1, X, 0, 1) and an identical pattern has been programmed for authentication. The logic function suggested in FIG. 13 for performing authentication is: [{a XOR b} OR {a' XOR b'}]. Other logic functions could also be used in various method implementations such as [{a XOR b} AND {a' XOR b'}]. Use of the methods for DRAM or ReRAM memories produces a dense implementation, as the arrays for storing and managing a PUF pattern are only 4× the size of the effective PUF pattern to be stored.

Spin Torque Transfer-Magnet Random Access Memories (STT-MRAMS) and other MRAMS can be considered a subset of ReRAMs in terms of their mapping and method applications. The structure and methods disclosed in the FIG. 13 would also apply to these magnetic memory technologies.

In particular system implementations, ReRAM memories may be used in both RAM and CAM arrangements. The particular physical parameter that is used to evaluate the memory cells is the resistivity of Vset of the cell. High values of Vset are associated with 1's, low value of Vset are associated with 0s, and those values in between threshold values of Vset are blanked as Xs. For a RAM architecture design, an active column of memory cells is selected which is tested and a companion column of memory cells is used to store the resulting 0s, 1s, and Xs. As in the various method implementations disclosed herein, the companion column may store a 0 when a 1 cell is identified, a 1 when a 0 cell is identified, and either a 0 or 1 when a X cell is identified. The active column is used to store the other 1, 0, or 0 and 1 paired value, respectively.

In a CAM architecture, four columns are required to test all of the states, a first and third column as the active and companion columns for storing the PUF reference patterns. The second and fourth columns are used to store the PUF response patterns for analysis during authentication. As was previously described as illustrated in FIG. 13, in a CAM architecture, all PUF response patterns/PUF reference pattern pairs in word line 1 can be checked for matching at once according to the logic function [{a XOR b} OR {a' XOR b'}]. Both the RAM and CAM architectures used in these system implementations use standard ReRAM arrays and state machines.

An experiment was run to test whether Vset variations in a ReRAM array of memory cells could be used to generate reliable ternary states to create challenge-response-pairs that would allow authentication cycles to take place with sufficiently low error rates to be useful. This experiment is detailed in the subsequent sections of this document.

In order to model realistic ReRAM PUF pattern generation, Cu/TaO$_x$/Pt resistive devices were fabricated in a crossbar array on a thermally oxidized Si wafer 6 with a layer 8 of SiO$_2$ 800 nm thick. Such a design may be found in the paper by Gargi Ghosh and Marius Orlowski, "Write and Erase Threshold Voltage Interdependence in Resistive Switching Memory Cells," *IEEE Transactions on Electron Devices* V. 62, No. 9, p. 2850-2857 (2015), the disclosure of which is hereby incorporated entirely herein by reference. Both metal electrodes and solid electrolyte were deposited by E-beam evaporation and patterned by lift-off techniques. The oxygen-deficient TaO$_x$ layer 10, 16 nm thick, was deposited by evaporating TaO$_x$ pellets without O$_2$ injection to the evaporation chamber. In the memory cell design, the top Cu electrode 12, 150 nm thick, runs perpendicularly to the bottom Pt electrode 14, which was 60 nm thick and included titanium. The width of the metal lines varied between 1 micron and 35 microns.

Figure 15:
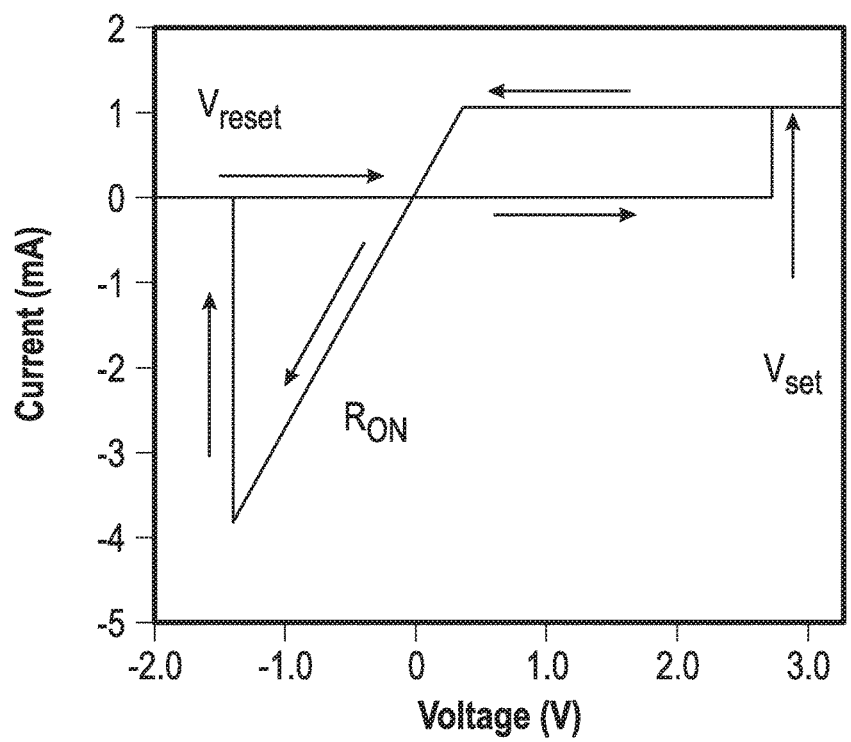
FIG. 15 is a diagram of the operational process for programming a ReRAM memory cell.

A single Cu/TaO$_x$/Pt switch relies on electrochemical formation and rupture of a conductive filament (CF) bridging the TaO$_x$ dielectric 10 between the active Cu electrode 12 and the inert Pt electrode 14. Referring to FIG. 15, a minimum Vset voltage exists that when applied across the switch at which a CF is formed. When the voltage applied to the Cu electrode 12 is pulsed or swept at a positive voltage, the current remains substantially zero until a critical voltage Vset is reached, at which a Cu CF is formed that connects the Cu electrode 12 and Pt electrode 14. The memory cell then switches from a high resistive state (HRS) characterized by an Roff of 1-900 megaohms to a low resistive state (LRS) characterized by an Ron of 70-6000 ohms, yielding a ratio of Roff/Ron of approximately $10^3$-$10^7$. When a negative voltage is applied to the LRS state, the CF ruptures at a critical voltage of Vreset and the cell switches from the LRS to the FIRS state. The rupture of the CF is triggered by a critical current Ireset=Vreset/Ron. Therefore, to ensure a successful set operation to logic state 1, the magnitude of the applied maximum voltage must be slightly larger than the magnitude of the Vset voltage for the particular memory cell. Similarly, programming a logic 0 requires a reset maximum voltage slightly larger in magnitude than Vreset for a particular cell.

The cell's switching parameters (Vset, Vrest, Ron, and Roff) are all subject to statistical variations. The variability of cell parameters degrades memory operation margins and the functional array design; however, the variability lends itself to be used in security applications for use in PUF pattern generation. ReRAM may be very robust against physical attacks because the variations of the characteristic parameters (Vset, Vrest, Ron, and Roff) come from structural material properties and are the result of atomic level variation. Furthermore, the ReRAM variability is inherent not only from manufacturing variations, but also in the electro-chemical ionic switch mechanisms of the ReRAM device itself. A ReRAM device cannot be probed by invasive techniques as the atomic changes of the defect densities of the device during operation are hardly visible, even under high resolution transmission electron microscopy. ReRAM is also less sensitive to side-channel attacks due to the lower power characteristics during read cycles, as well as attacks based on photon emission analysis. ReRAM does not emit photons like hot carriers in MOSFET transistors in SRAM or in a floating gate MOSFET cell. ReRAM also may have intrinsically higher density, faster access speed, and better energy efficiency than other conventional memory technologies.

Figure 16:
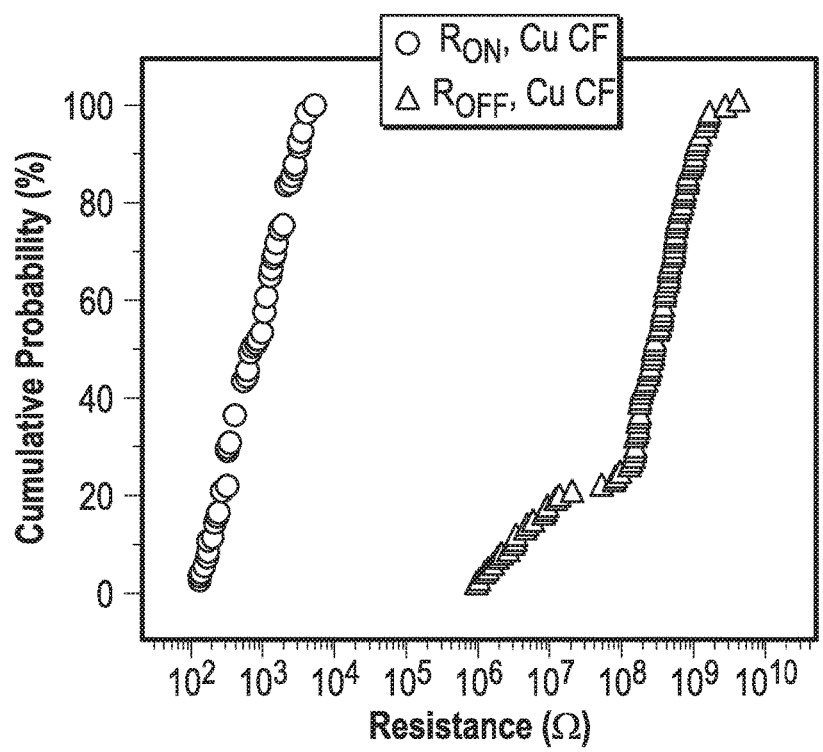
FIG. 16 is a graph showing the cumulative distributions of the on and off resistance of a ReRAM memory implementation.

Referring to FIG. 16, a cumulative probability distribution of the Ron and Roff resistances of the ReRAM samples used in the experiment is illustrated. Either or both distributions could be used as a physical parameter for use in PUF pattern generation. The Roff distribution has the advantage that it has larger variation, and also, it can minimize the parasitic voltage drop outside the active structure. Preliminary data indicated that the resistance shift under temperature changes from 0 C to 85 C was less than 10% for both Ron and Roff.

Figure 17:
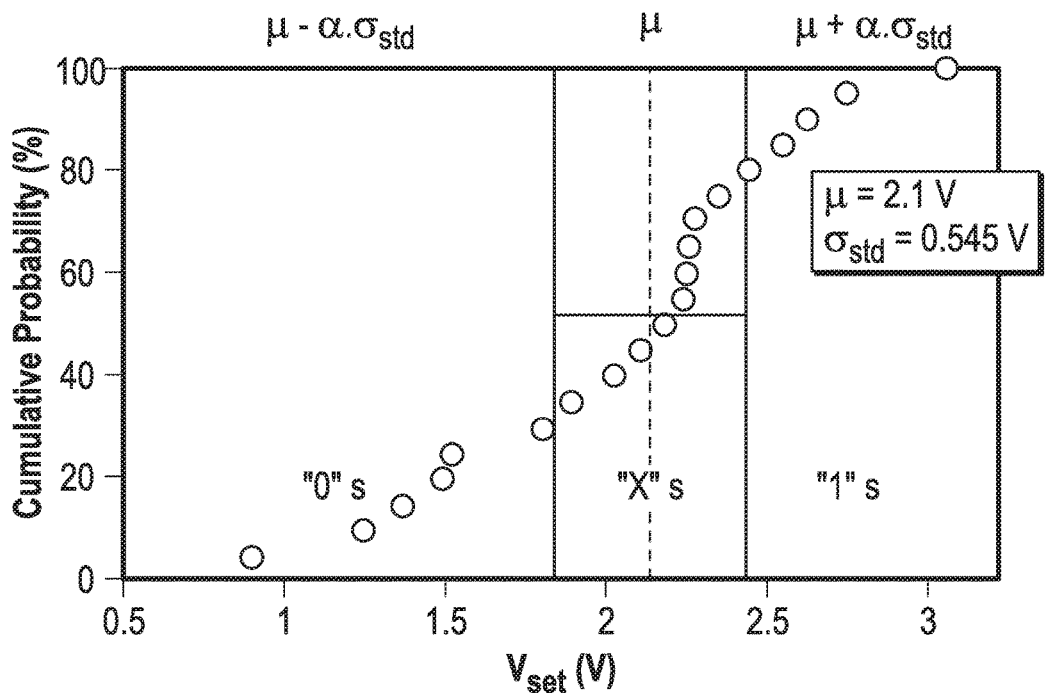
FIG. 17 is a cumulative probability distribution of the Vset voltage for an array of ReRAM memory cells.

Referring to FIG. 17, the cumulative probability distribution for the Vset parameter for the entire sample array of 10,000 memory cells is illustrated. As illustrated, the mean of this distribution µ=2.1 V indicated by the dash line, and the standard deviation is σstd=0.545 V. In FIG. 17, there are two lines (first and second threshold values) at a distance of α*σstd from the mean, where α is a PUF design parameter. This voltage dependent switching probability becomes the source of the randomness used for the generation of the experimental PUF patterns. During the experiment, all the cells in the ReRAM memory array were first set to the HRS. Then, by biasing the memory cells at Vset=µ, every cell then was given an equal opportunity to be characterized as a 0 or a 1. In this approach, the mean µ and the standard deviation σstd are used to create two dividers (first and second threshold values) to associate with the three types/states of the memory cells.

During the generation of a PUF reference pattern, the cells were classified as 0, 1, or X depending on whether they fell below the first threshold µ–α*σstd, above the second threshold µ–α*σstd, or between the first and second threshold values, respectively. Those cells with a 0 state value below a minimum Vset (0.8V) were kept in the LRS on the active columns while the companion columns were programed as HRS (1). The cells with a 1 state value above a maximum Vset (3.4 V) are programmed as HRS (1) while the companion columns are programmed LRS (0). Those cells with an X state were programmed to the same state as the corresponding cell in the companion column (LRS/LRS or HRS/HRS). The dimensionless parameter a is used to analyze the statistical model that describes the populations of 0, 1, and X memory cells in the experiment as well as the error rate of a potential challenge response pair. When α=0, the population of Xs is zero and the population of 1 and 0 cells is equal. When α>1, more than 60% of the cells will be Xs. It can also be seen than any α≠0 may somewhat guard against undesired bit-flips lower the mismatch rates for challenge response pairs. The larger α, the larger the safety margin against bit-flips, and the lower the CRP error rate is expected to be. For a large enough α, any statistically reasonable bit flip will be confined to the population of Xs, thus leaving the 0 and 1 populations stable and predictable. In such implementations, this may also guard against environmental factors (i.e., temperature variation) or interferences (i.e., electromagnetic). Accordingly, a can be used to strengthen the stability and reduce the error rate of the PUF patterns at the expense of blanking a higher proportion of the cells with an X state value.

The PUF reference patterns were generated using the ReRAM memory array using the methods disclosed in this document, and using the Vset parameter as the physical parameter and the first and second threshold values disclosed herein. The binary PUF data stream was stored, keeping only 0s and 1s in the secure server with the X's remaining in the ReRAM memory array for use in further authentication. The PUF comparison patterns were generated using the ReRAM array using looser criteria than the reference patterns and stored in the secure server. The PUF comparison patterns were created by testing only the 0 and 1 memory cells and ignoring the X memory cells. The testing to generate the PUF comparison patterns was done using a single threshold value of 2.1 V where an error would only occur if a 0 memory cell, previously tested at the value of the second threshold tested with a Vset above 2.1 or a 1 memory cell tested with a Vset below 2.1. The PUF comparison pattern was stored back in the memory array along with the un-tested X. During authentication, all binary PUF reference and PUF comparison pattern pairs (CRPs) are tested, comparing the patterns generated by the memory array (PUF comparison patterns) against the previously generated patterns from the secure server (PUF reference patterns). An acceptable design point for the PUF patterns is where the cumulative variation in Vset remains within the buffer zones, allowing the PUF comparison patterns and PUF reference pattern pairs to not vary thereby yielding a low CRP error rate.

Figure 18A:
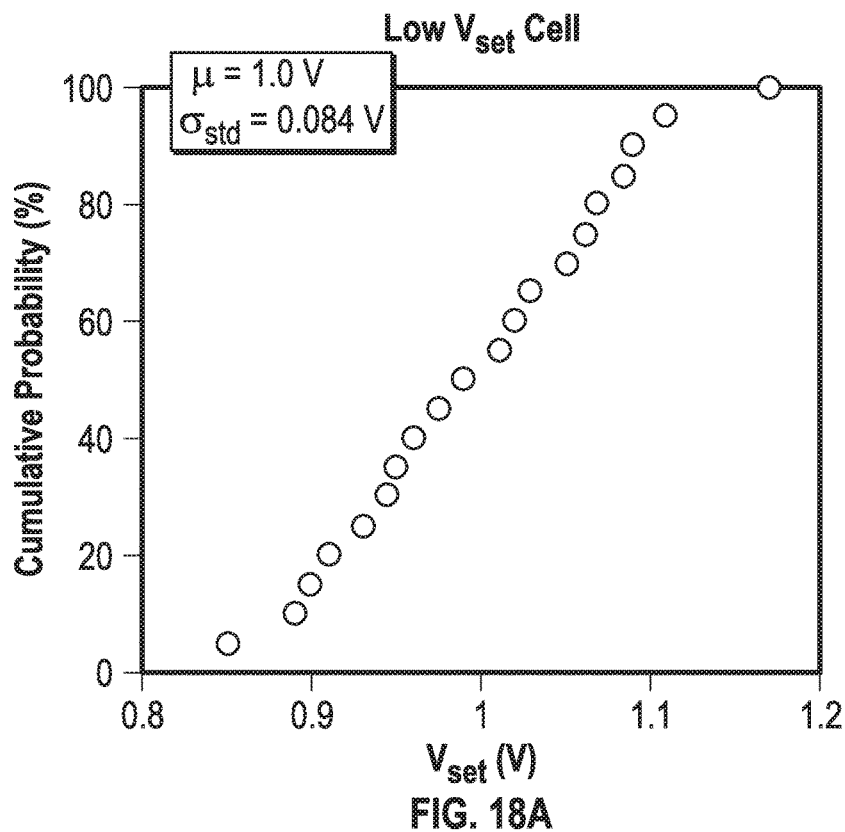
FIG. 18A is a cumulative probability distribution for a ReRAM memory cell with a low Vset voltage.
Figure 18B:
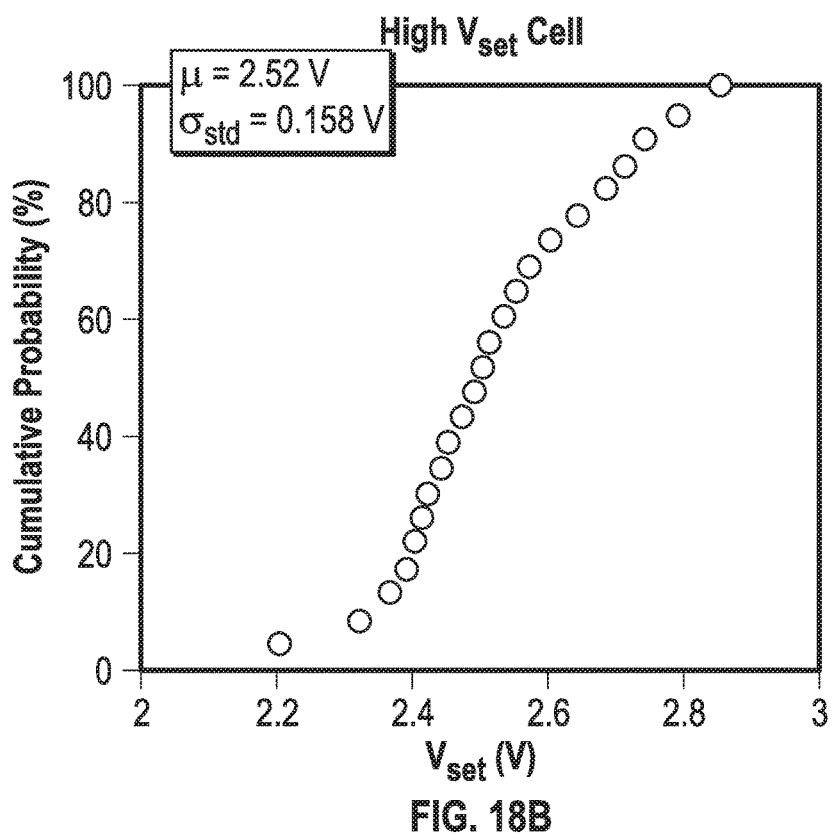
FIG. 18B is a cumulative probability distribution for a ReRAM memory cell with a high Vset voltage.
Figure 19:
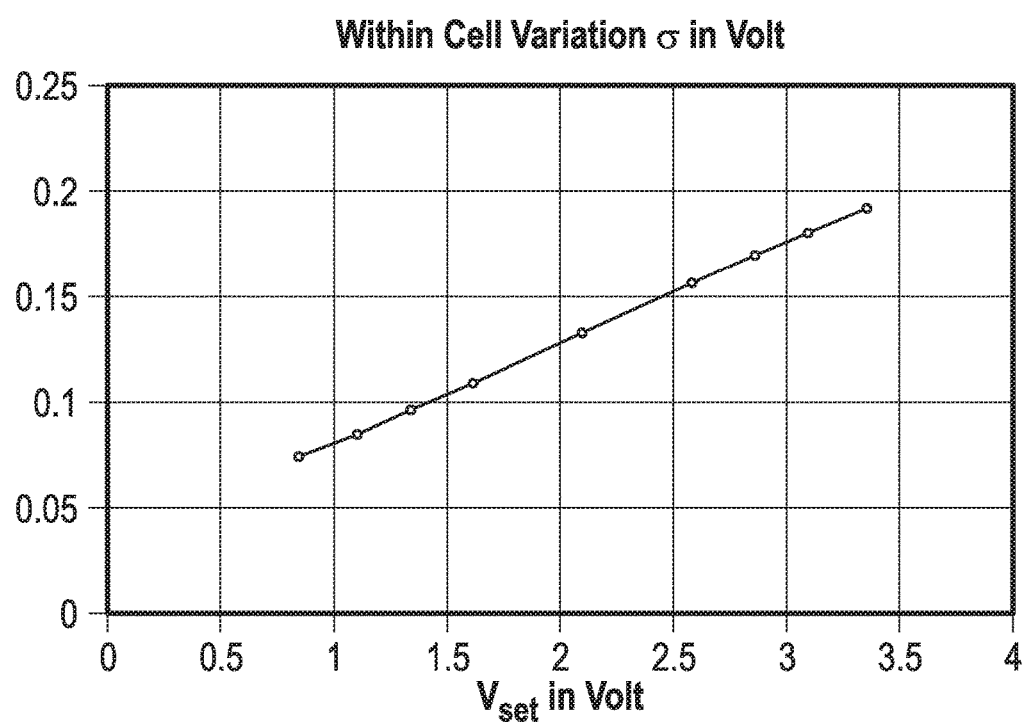
FIG. 19 is a graph of the standard deviation of Vset within a ReRAM memory cell in volts.

During the experiment, the robustness of the PUF pattern generation method and the CRP error rate was analyzed using the Vset distribution for several individual ReRAM cells. Referring to FIG. 18A, a cell with a low Vset value (Vset≈1 V) and referring to FIG. 18B, a cell with a high Vset value (Vset≈2.5 V) were selected from the distribution of memory cells in the array. Both cells were subjected to repeated reset and set operations under the same conditions. FIGS. 18A and B show the cumulative probability distributions of the Vset values for each cell. Vset distribution for the low Vset cell is centered around 1 V and its standard variation σstd=0.084 V is smaller than the overall variation of Vset σstd=0.545 V of the array. For the high Vset cell, the distribution is centered around 2.52 V and the σstd=0.158 V, also smaller than the array variation. From the physics of the ReRAM cell, it would be expected that a cell that requires high electric field (i.e., high Vset) will display larger variation than a cell that switches at lower electric fields (low Vset). The standard deviations for the single cells will influence the choice of PUF pattern design parameters. Based on the experimental results, the variation of each cell is shown in FIG. 19 as a function of the average Vset of these individual cells, which shows the within cell standard deviation versus the average Vset.

Tables 1 and 2 present a statistical analysis of the experimental data for varying a values, from 0.5 to 2.0 while the single threshold used to generate the responses varies from 1.8 V to 2.1 V. The analysis assumed normal distributions.

TABLE 1

| α | ασ (V) | % of 0s | Max for 0s (V) | σ0 | Mean for 0s μ0 | % of 1s | Min for 1s (V) | σ1 | Mean for 1s μ1 | % of Xs |
|---|---|---|---|---|---|---|---|---|---|---|
| 0.5 | 0.27 | 37.5 | 1.83 | 0.106 | 1.62 | 37.5 | 2.37 | 0.162 | 2.58 | 25 |
| 1 | 0.54 | 16 | 1.56 | 0.098 | 1.34 | 16 | 2.64 | 0.172 | 2.86 | 68 |
| 1.5 | 0.81 | 6.5 | 1.29 | 0.086 | 1.10 | 6.5 | 2.91 | 0.182 | 3.10 | 87 |
| 2 | 1.08 | 2 | 1.02 | 0.076 | 0.84 | 2 | 3.18 | 0.194 | 3.36 | 94 |

TABLE 2

| α | % of 0s | Error rate 0 read as 1 tipping @ 2.1 V | Error rate 0 read as 1 tipping @ 1.9 V | Error rate 0 read as 1 tipping @ 1.8 V | % of 1s | Error rate 1 read as 0 tipping @ 2.1 V | Error rate 1 read as 0 tipping @ 1.9 V | Error rate 1 read as 0 tipping @ 1.8 V | % of Xs |
|---|---|---|---|---|---|---|---|---|---|
| 0.5 | 37.5 | 650 ppm | 80,000 ppm | 5% | 37.5 | 35,000 ppm | 4,500 ppm | 200 ppm | 25 |
| 1 | 16 | 0 | 8 ppm | 1000 ppm | 16 | 1000 ppm | 8 ppm | 0.5 ppm | 68 |
| 1.5 | 6.5 | 0 | 0 | 0 | 6.5 | 75 ppm | 0.3 ppm | 0 | 87 |
| 2 | 2 | 0 | 0 | 0 | 2 | 0.3 ppm | 0 | 0 | 94 |

The impact of the error rates in Table 2 on the authentication cycle of a PUF data stream of N bits can be calculated using the Poisson equation. If P(n) is the probability to have n failures over N bits, p is the probability to have one CRP mismatch due to errors as set forth in $P(n)=\lambda^n/n!\ e^{-\lambda}$ where $\lambda=pN$. Selecting the design point as α=1 with a threshold of 1.9 volts yields an error rate of p=8 ppm. Assuming N=128, P(0)=99.2%; P(1)=0.794%, P(2)=30 ppm; and P(3)≈0. Given these calculations, it is clear that the probability that at least 126 bits of the PUF comparison pattern match the PUF reference pattern during the authentication cycle over 128 CRP candidate pairs is almost certain. About 68% of the memory cells are blanked with X state values and the remainder are used for PUF pattern generation. Based on this information, to generate of PUF of 128 bits, the memory array involved needs to be in the 1000 bit range and 50% of the cells will be used as companion cells.

The experimental data above was also used to model a ternary PUF data stream using the method implementations disclosed herein. In this case, third and fourth threshold values were determined to determine additional memory cells to be assigned BX state values. The PUF reference patterns were generated using the following threshold values: for 0s, the first threshold was 1.29 V, which statistically represents 6.5% of the cells with a mean μ=1.1 V and σ=0.086 V. For Xs, the third threshold was 1.9 V and the fourth threshold was 2.0 V which included 7.5% of the cells with a mean μ=1.95 V and a σ=1.3 V. For 1s, the second threshold is set to 2.91 V which includes 6.5% of the cells with a mean μ=3.1V and a σ=0.186 V. The remainder of the cells, about 80% were assigned the BX state value and blanked. The PUF comparison patterns were generated using the transition point between 0s and Xs at 1.45 V and the transition point between Xs and 1s at 2.45 V. With these values, the calculated error rates for the CRPs was as follows: 0 read as an X=2,000 ppm; X read as a 0/1=8,000 ppm, and 1 read as an X=10,000 ppm. The worst case is 1s reading as Xs. This error rate is higher than what is expected from binary PUF CRP data, however considering that the entropy of the CRPs will be $3^N$ rather than $2^N$ this may be a good trade off. Using the Poisson equation with N=128 and p=10,000 ppm (1%), the probability of having n errors P(n) is as follows: P(7)=300 ppm; P(8)=50 ppm; P(9)=7 ppm; P(10)<1 ppm.

Accordingly, the probability to have 118 CRPs of the 128 match is almost certain. The entropy that results from using the ternary PUF data stream $3^{118}=2*10^{56}$ is still greater than $2^{128}=3.5*10^{38}$. Given this, the experimental data indicates that with the judicious selection of error rate threshold values, ternary PUF data streams could be successfully implemented.

In additional to the concept of using PUFs for authentication, the PUF generating methods and systems disclosed herein may also be used in cryptographic operations to generate random numbers to be used in encoding data being transmitted between devices. This is done by using the X cells to generate random numbers to be used in encrypting data. One method implementation is carried out by programming in advance the entire ReRAM arrays with 0s and 1s based on Vset determination. The cells that are close to the transition point are kept for random number generation, while the cells that are solidly 0s, 1s, and defective cells are simply blanked with an X. Table 3 summarizes a statistical analysis of such a method implementation using the data presented in FIG. 17. With α=0.05 representing 4% of the cells, the ratio 1/0 for a single cell is expected to be in the 46% to 54% range for 50% of the cells and 54% to 46% for the other half, indicating that the likelihood these cells will randomly be 1 or 0 is reasonably close to 50/50.

TABLE 3

| α | ασ (V) | % of 0s | % of 1s | % of Xs | Xs read as a 0 Min | | Prob. Flip for Xs 0 > 1 | Xs read as a 1 Max | | Prob. Flip for Xs 1 > 0 |
|---|---|---|---|---|---|---|---|---|---|---|
| | | | | | | μ | | | μ | |
| 0 | 0 | 50 | 50 | 0 | N/A | N/A | N/a | N/A | N/A | N/A |
| 0.05 | 0.027 | 48 | 48 | 4 | 2.072 | 2.087 | 46% | 2.127 | 2.113 | 46% |
| 0.1 | 0.054 | 46 | 46 | 8 | 2.046 | 2.076 | 43% | 2.154 | 2.124 | 43% |
| 0.15 | 0.081 | 44 | 44 | 12 | 2.019 | 2.060 | 38% | 2.181 | 2.140 | 38% |

Given these values, it would take about 6,400 ReRAM cells to get 128 active cells useable for random number generation. Considering that at a point in time, half of the cells will have 54% oriented in one direction while the other half have only 46% oriented in the other direction, the mean distribution is centered at 64 bits in each state, like true random numbers. To improve the randomness the following methods may be implemented for various method implementations. First, a much larger number of ReRAM cell candidates may be selected for use in random number generation which means that the generation can take place using new cells of random state. The 128 candidate cells for random number generation can be selected in an order than is random, which then makes this randomness cumulative with the randomness of the state of each cell. The manufacturing variation of Vset may be tightened which increases the ratio of the cells at the threshold between 0s and 1s. For example, if the 4% of non-blanked cells turns into 10%, only 2,500 cells would be needed to generate 128 bit random numbers, and the 46% to 54% ratio could be improved closer to 50%. Those of ordinary skill will appreciate how to use the principles disclosed in this document to create other methods and systems for generating random numbers using PUF patterns.

In places where the description above refers to particular implementations of PUF generating systems and implementing components, sub-components, methods and sub-methods, it should be readily apparent that a number of modifications may be made without departing from the spirit thereof and that these implementations, implementing components, sub-components, methods and sub-methods may be applied to other PUF generating systems.

What is claimed is:

1. A method of identifying a memory cell state for use in a physically unclonable function (PUF), the method comprising:
    comparing at least one physical parameter of a memory cell with a threshold value of the physical parameter;
    identifying a relationship of the at least one physical parameter of the memory cell to the threshold value;
    associating one of a 0, 1, and X state to the memory cell based on the relationship of the at least one physical parameter to the threshold value;
    programming at least one state storage memory cell to store a programmed value corresponding with the associated 0, 1, or X state;
    including the programmed value of the at least one state storage memory cell in a PUF data stream;
    wherein programming at least one state storage memory cell comprises programming a first state storage memory cell and a second state storage memory cell and;
    if the associated state of the memory cell is a 0, programming a 0 in the first state storage memory cell and programming a 1 in the second state storage memory cell;
    if the associated state of the memory cell is a 1, programming a 1 in the first state storage memory cell and programming a 0 in the second state storage memory cell;
    if the associated state of the memory cell is an X, programming one of a 0 in the first state storage memory cell and a 0 in the second state storage memory cell and programming a 1 in the first state storage memory cell and a 1 in the second state storage memory cell.

2. The method of claim 1, wherein the memory cell is a first memory cell and the at least one state storage memory cell is at least a first state storage memory cell, and the method further comprises:
    comparing at least one physical parameter of a second memory cell with the threshold value of the physical parameter;
    identifying a relationship of the at least one physical parameter of the second memory cell to the threshold value;
    associating one of the 0, 1, and X state to the second memory cell based on the relationship of the at least one physical parameter to the threshold value;
    programming at least one second state storage memory cell to store a programmed value corresponding with the associated 0, 1, or X state;
    including the programmed value of the at least one second state storage memory cell in the PUF data stream.

3. The method of claim 1, wherein the at least one state storage memory cell is the memory cell itself.

4. The method of claim 1, wherein the first state storage memory cell is comprised in a first row of memory cells and the second state storage memory cell is comprised in a second row of memory cells adjacent to the first row.

5. The method of claim 1, wherein the first state storage memory cell is comprised in a first column of memory cells and the second state storage memory cell is comprised in a second column of memory cells adjacent to the first column.

6. The method of claim 1, wherein the PUF data stream is a PUF ternary data stream comprising 0, 1, and X programmed values.

7. The method of claim 1, wherein the PUF data stream is a PUF binary data stream comprising 0 and 1 programmed values.

8. The method of claim 7, further comprising extracting from the PUF data stream the X programmed values to form the PUF binary data stream.

9. The method of claim 1, wherein the memory cell is selected from the group consisting of a static random-access memory (SRAM), a dynamic random-access memory (DRAM), a resistive random-access memory (ReRAM), a magnetic random-access memory (MRAM), a flash memory, an electrically erasable programmable read-only memory (EEPROM), and any combination thereof.

10. A method of identifying a memory cell state for use in a physically unclonable function (PUF), the method comprising:
    comparing at least one physical parameter of a memory cell with a first threshold value of the physical parameter and with a second threshold value of the physical parameter;
    identifying a relationship of the at least one physical parameter of the memory cell to the first threshold value and to the second threshold value;
    associating one of a 0, 1, and X state to the memory cell based on the relationship of the at least one physical parameter of the memory cell to one of the first threshold value, the second threshold value and both the first threshold value and the second threshold value;
    programming at least one state storage memory cell to store a programmed value corresponding with the associated 0, 1, or X state; and
    including the programmed value of the at least one state storage memory cell in a PUF data stream;
    wherein programming at least one state storage memory cell comprises programming a first state storage memory cell and a second state storage memory cell and;
    if the associated state of the memory cell is a 0, programming a 0 in the first state storage memory cell and programming a 1 in the second state storage memory cell;
    if the associated state of the memory cell is a 1, programming a 1 in the first state storage memory cell and programming a 0 in the second state storage memory cell;
    if the associated state of the memory cell is an X, programming one of a 0 in the first state storage memory cell and a 0 in the second stage storage memory cell and programming a 1 in the first state storage memory cell and a 1 in the second state storage memory cell; and
    if the associated state of the memory cell is a BX, programming one of a 0 in the first state storage memory cell and a 0 in the second state storage memory cell and programming a 1 in the first state storage memory cell and a 1 in the second state storage memory cell.

11. The method of claim 10, wherein identifying a relationship of the at least one physical parameter of the memory cell further comprises:
    identifying a relationship of the at least one physical parameter of the memory cell to a third threshold value and to a fourth threshold value;
    associating one of a 0, 1, X and BX state to the memory cell based on the relationship of the at least one physical parameter of the memory cell to one of the first threshold value, second threshold value, third threshold value, fourth threshold value, and any combination thereof;
    programming at least one state storage memory cell to store a programmed value corresponding with the associated 0, 1, X, or BX state;
    including the programmed value of the at least one state storage memory cell in the PUF data stream.

12. The method of claim 10, wherein associating one of a 0, 1, X and BX state to the memory cell based on the relationship of the at least one physical parameter of the memory cell further comprises associating the BX state to the memory cell if the value of the at least one physical parameter lies between one of both the first threshold value and the third threshold value and both the second threshold value and the fourth threshold value.

13. The method of claim 10, wherein the PUF data stream is a PUF quaternary data stream comprising 0, 1, X, and BX programmed values.

14. The method of claim 10, wherein the PUF data stream is a PUF ternary data stream comprising 0, 1, and X programmed values.

15. The method of claim 14, further comprising extracting from the PUF data stream the BX programmed values to form the PUF ternary data stream.

16. A method of identifying a memory cell state for use in a physically unclonable function (PUF) reference pattern and PUF comparison pattern, the method comprising:
    comparing at least one physical parameter of a memory cell with a threshold value of the physical parameter;
    identifying a relationship of the at least one physical parameter of the memory cell to the threshold value;
    associating one of a 0, 1, and X state to the memory cell based on the relationship of the at least one physical parameter to the threshold value;
    programming at least one state storage memory cell to store a programmed value corresponding with the associated 0, 1, or X state;
    including the programmed value of the at least one state storage memory cell in a reference PUF data stream;
    in response to receiving an authentication request, only if the memory cell has a 0 or 1 state assigned, comparing the at least one physical parameter of the memory cell with the threshold value of the physical parameter;
    re-identifying a relationship of the at least one physical parameter of the memory cell to the threshold value;
    re-associating one of a 0 and 1 state to the memory cell based on the relationship of the at least one physical parameter to the threshold value;
    programming at least one state storage memory cell to store a programmed value corresponding with the re-associated 0 or 1 state;
    including the programmed value of the at least one state storage memory cell in a comparison PUF data stream; and authenticating a device using the reference PUF data stream and the comparison PUF data stream, the method comprising:

retrieving the PUF reference pattern stored in one of a plurality of memory cells used to generate the PUF reference pattern, a secure storage memory coupled to the plurality of memory cells, and any combination thereof;

receiving a PUF comparison pattern from a device seeking authentication;

comparing the state values of the reference PUF pattern with the state values comprised in the comparison PUF pattern;

if the state values of the PUF comparison pattern match the state values of the reference PUF pattern above a predetermined threshold value, then approving authentication of the device.

17. The method of claim 16, wherein comparing the state values of the reference PUF pattern with the state values comprised in the comparison PUF pattern further comprises comparing using a ternary content addressable memory (TCAM).

* * * * *

UNITED STATES PATENT AND TRADEMARK OFFICE
CERTIFICATE OF CORRECTION

PATENT NO. : 9,985,791 B2  
APPLICATION NO. : 14/958436  
DATED : May 29, 2018  
INVENTOR(S) : Bertrand Cambou It is certified that error appears in the above-identified patent and that said Letters Patent is hereby corrected as shown below:

In the Specification

Column 15, Line 39, delete "LRS to the FIRS state. The" and insert --LRS to the HRS state. The--

Column 16, Line 42, delete "dimensionless parameter a is used to" and insert --dimensionless parameter α is used to--

Column 16, Line 57, delete "According, a can be used to" and insert --According, α can be used to--

Column 18, Line 2, delete "varying a values, from" and insert --varying α values, from--

Column 18, Line 61, delete "For is, the second" and insert --For 1s, the second--

Signed and Sealed this  
Tenth Day of July, 2018

Andrei Iancu  
*Director of the United States Patent and Trademark Office*